United States Patent
Hashimoto et al.

(10) Patent No.: US 10,059,209 B2
(45) Date of Patent: *Aug. 28, 2018

(54) VEHICLE CONTROL DEVICE

(71) Applicant: Toyota Jidosha Kabushiki Kaisha, Toyota-shi, Aichi-ken (JP)

(72) Inventors: Toshiya Hashimoto, Miyoshi (JP); Noritake Mitsutani, Toyota (JP); Kenji Yamada, Komaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 473 days.

This patent is subject to a terminal disclaimer.

(21) Appl. No.: 14/739,410

(22) Filed: Jun. 15, 2015

(65) Prior Publication Data

US 2015/0367737 A1   Dec. 24, 2015

(30) Foreign Application Priority Data

Jun. 20, 2014   (JP) .................. 2014-127726

(51) Int. Cl.
*B60L 11/02*   (2006.01)
*B60L 11/18*   (2006.01)
(Continued)

(52) U.S. Cl.
CPC ............ *B60L 11/126* (2013.01); *B60L 11/14* (2013.01); *B60L 11/1861* (2013.01); *B60L 11/1868* (2013.01); *B60L 2210/12* (2013.01); *B60L 2210/14* (2013.01); *B60L 2210/30* (2013.01); *B60L 2240/36* (2013.01); *B60L 2240/525* (2013.01); *B60L 2240/526* (2013.01); *B60L 2240/527* (2013.01); *B60L 2240/547* (2013.01); *B60L 2240/549* (2013.01);
(Continued)

(58) Field of Classification Search
None
See application file for complete search history.

(56) References Cited

U.S. PATENT DOCUMENTS 8,928,174 B2 *   1/2015   Muto .................. B60L 11/1855
                                                                      307/71
2010/0045103 A1 *   2/2010   Mitsutani .................. B60L 3/12
                                                                      307/9.1
(Continued)

FOREIGN PATENT DOCUMENTS

JP   2004-364387 A   12/2004
JP   2008-228378 A    9/2008
(Continued)

OTHER PUBLICATIONS

Notice of Allowance dated Apr. 13, 2017 in U.S. Appl. No. 14/705,367, filed May 6, 2015; Inventor: Toshiya Hashimoto.

*Primary Examiner* — Jared Fureman
*Assistant Examiner* — Joel Barnett
(74) *Attorney, Agent, or Firm* — Dinsmore & Shohl LLP

(57) ABSTRACT

A converter is capable of using two power sources located on a first side by switching connection of the two power sources between series connection and parallel connection. Under certain conditions, such as when a detected atmospheric pressure is lower than a predetermined value, frequency of use of the two power sources in series connection is reduced in the converter. It is thereby possible to prevent generation of excessive voltage by the power converter.

6 Claims, 25 Drawing Sheets

(51) Int. Cl.
*B60L 11/12* (2006.01)
*B60L 11/14* (2006.01)

(52) U.S. Cl.
CPC ........ *B60L 2260/44* (2013.01); *Y02T 10/6217* (2013.01); *Y02T 10/7005* (2013.01); *Y02T 10/7022* (2013.01); *Y02T 10/7044* (2013.01); *Y02T 10/7066* (2013.01); *Y02T 10/7077* (2013.01); *Y02T 10/7225* (2013.01); *Y02T 10/7233* (2013.01); *Y02T 10/7241* (2013.01)

(56) References Cited

U.S. PATENT DOCUMENTS

2013/0134786 A1* 5/2013 Ishigaki ................ H02M 3/158
307/71
2014/0358341 A1* 12/2014 Jeon .................... B60L 11/1892
701/22
2015/0303838 A1 10/2015 Takahashi

FOREIGN PATENT DOCUMENTS

| JP | 2008-295123 A | 12/2008 |
| JP | 2010-183769 A | 8/2010 |
| JP | 2010-246320 A | 10/2010 |
| JP | 2012-070514 A | 4/2012 |
| JP | 2013-051831 A | 3/2013 |
| JP | 2013-077452 A | 4/2013 |
| WO | 2014073632 A1 | 5/2014 |

* cited by examiner

VEHICLE CONTROL DEVICE

PRIORITY INFORMATION

This application claims priority to Japanese Patent Application No. 2014-127726 filed on Jun. 20, 2014, which is incorporated herein by reference in its entirety.

TECHNICAL FIELD

The present invention relates to a control device for vehicle, including a power converter which performs electric power transmission between a first side and a second side and which is capable of using two power sources located on the first side by switching connection of the two power sources between series connection and parallel connection.

BACKGROUND ART

An electrically-driven vehicle, such as a hybrid vehicle or an electric automobile, often employs a system in which DC power from a battery is converted into AC power in an inverter, and the converted AC power is used to drive a motor or a motor generator. Further, the voltage of the battery is often boosted using a boost converter (voltage transformer) and supplied to the motor.

There has been proposed a power supply system which uses such a means for variously changing ON/OFF operation patterns of four switching elements in a boost converter so as to switch connection of a plurality of batteries provided on the low-voltage side between series connection and parallel connection, so that the system is capable of operating in various operation modes, such as a mode for boosting voltage while using the series connection and a mode for boosting voltage while using the parallel connection (for example, refer to JP 2012-70514 A).

In such a power supply system, as the output voltage can be changed over a wide range, by changing the inverter input voltage in accordance with an output from the motor generator, efficient operation of the motor generator can be achieved.

Here, switching elements in the inverter must be prevented from being applied with a voltage higher than the withstand voltage, and also from being operated in such a manner that they overheat. Particularly in a power supply system as described in JP 2012-70514 A, as the output can have a high voltage, it is necessary to reliably protect the switching elements and the like.

SUMMARY

The present invention provides a control device for a vehicle, including a power converter which performs electric power transmission between a first side and a second side and which is capable of using two power sources located on the first side by switching connection of the two power sources between series connection and parallel connection, wherein, when atmospheric pressure is lower than a predetermined value, the frequency of operation using the series connection in the power converter is reduced compared to when the atmospheric pressure is at or above that predetermined value. The present invention also provides a control device for a vehicle, including a power converter which performs electric power transmission between a first side and a second side and which is capable of using two power sources located on the first side by switching connection of the two power sources between series connection and parallel connection, wherein, when atmospheric pressure is undetectable, frequency of operation using the series connection in the power converter is reduced compared to when the atmospheric pressure is detectable.

The present invention also provides a control device for a vehicle, including (i) a power converter which performs electric power transmission between a first side and a second side and which is capable of using two power sources located on the first side by switching connection of the two power sources between series connection and parallel connection, and (ii) an inverter connected to the second side of the power converter, wherein, when temperature of the inverter is higher than a predetermined value, frequency of operation using the series connection in the power converter is reduced compared to when the temperature of the inverter is lower than the predetermined value.

The present invention also provides a control device for a vehicle, including (i) a power converter which performs electric power transmission between a first side and a second side and which is capable of using two power sources located on the first side by switching connection of the two power sources between series connection and parallel connection, and (ii) an inverter connected to the second side of the power converter, wherein, when the temperature of the inverter is undetectable, frequency of operation using the series connection in the power converter is reduced compared to when the temperature of the inverter is detectable.

The present invention also provides a control device for a vehicle, including (i) a power converter which performs electric power transmission between a first side and a second side and which is capable of using two power sources located on the first side by switching connection of the two power sources between series connection and parallel connection, and (ii) a motor connected to the second side of the power converter, wherein, when a locked state of the motor is detected, frequency of operation using the series connection in the power converter is reduced compared to when the motor is not in a locked state.

The present invention also provides a control device for a vehicle, including (i) a power converter which performs electric power transmission between a first side and a second side and which is capable of using two power sources located on the first side by switching connection of the two power sources between series connection and parallel connection, and (ii) a motor connected to the second side of the power converter, wherein, when whether or not the motor is in a locked state is undetectable, frequency of operation using the series connection in the power converter is reduced compared to when whether or not the motor is in a locked state is detectable.

According to an aspect of the present invention, when reducing the frequency of operation using the series connection in the power converter, only one of the two power sources is used by the power converter.

According to another aspect of the present invention, when reducing the frequency of operation using the series connection in the power converter, an engine mounted on the vehicle is driven to obtain drive power for the vehicle from the engine.

According to the present invention, it is possible to prevent generation of excessive voltage by the power converter under various status changes, and to thereby effectively protect switching elements, motor generators, and the like.

BRIEF DESCRIPTION OF THE DRAWINGS

Preferred embodiments of the present invention will be described in detail based on the following figures, wherein.

DESCRIPTION OF EMBODIMENTS

Embodiments of the present invention are described below with reference to the drawings. It should be noted that the present invention is not limited to the embodiments described herein.

System Configuration of Vehicle Equipped with Voltage Converter

Figure 1:
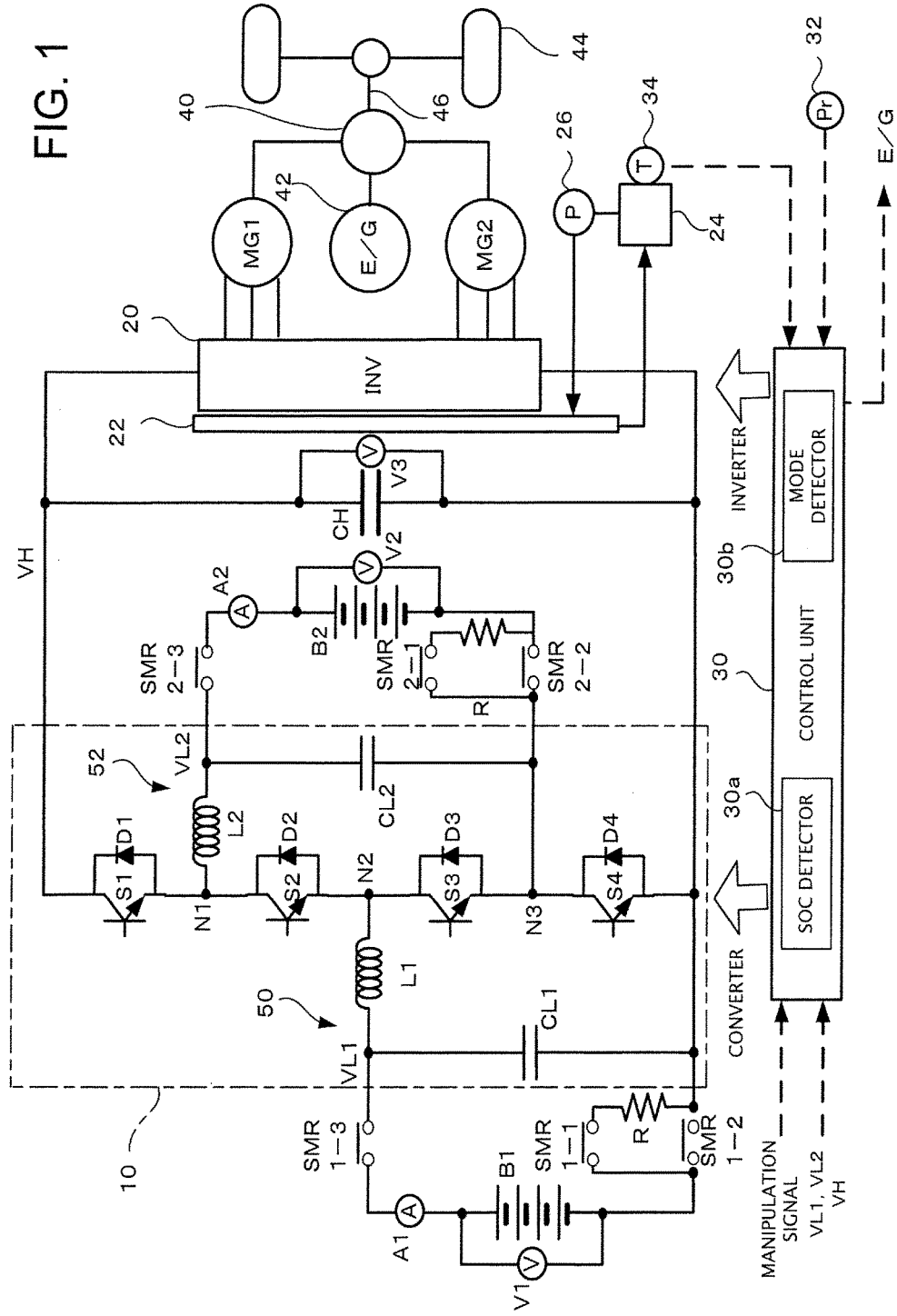
FIG. 1 is a diagram showing a configuration of a system including a control device for vehicle according to an embodiment of the present invention.

FIG. 1 shows a system configuration including a control device for vehicle according to an embodiment of the present invention. Two batteries B1, B2 are separately connected to a converter 10 serving as a power converter. The converter 10 boosts voltage of DC power VL1, VL2 supplied from the batteries B1, B2 located on a first side (low-voltage side), and outputs the boosted voltage V from positive and negative output terminals located on a second side (high-voltage side). The positive and negative output terminals of the converter 10 are connected to the inverter 20 via a positive line and a negative line, respectively. A high-voltage-side capacitor CH is arranged in the positive and negative lines on the input side of the inverter 20, and smoothes an input voltage supplied to the inverter 20. The voltage retained in this capacitor CH serves as the high-voltage-side voltage.

The inverter 20 comprises two three-phase inverters provided in parallel. Motor generators MG1, MG2 are respectively connected to one of the two inverters.

Accordingly, by controlling the respective ON/OFF states of each of switching elements in the two inverters of the inverter 20, a predetermined three-phase current is supplied to each of the motor generators MG1, MG2, whereby the motor generators MG1, MG2 are driven.

A control unit 30 is provided. This control unit 30 controls the ON/OFF states of switching elements in the converter 10 and the inverter 20, and thereby controls power conversion performed by the converter 10 and drive of the motor generators MG1, MG2 effected by the inverter 20. There are also provided a voltmeter V1 for detecting the voltage VL1 of the battery B1, a voltmeter V2 for detecting the voltage VL2 of the battery B2, and a voltmeter V3 for detecting the high-voltage-side voltage VH. The detected results of the voltmeters are supplied to the control unit 30.

Output shafts of the motor generators MG1, MG2 are connected to a motive power distributor 40, which may be composed of a planetary gear mechanism. An output shaft of an engine (E/G) 42 and a drive shaft 46 for transmitting motive power to wheels are also connected to this motive power distributor 40, and various power transmissions are carried out by the motive power distributor 40. For example, the motive power distributor 40 causes the drive shaft 46 to be driven by an output from the engine 42, causes the motor generator MG2 to be driven by an output from the engine so that electricity is generated therein, causes the wheels 44 to be driven by an output from the motor generator MG2, performs regenerative braking using the motor generator MG2, and the like. The motive power distributor 40 is also capable of outputting drive power from the motor generator MG1, performing regenerative braking using the motor generator MG2, and the like.

The converter 10 of the present embodiment has four switching elements S1-S4 connected in series. These switching elements S1-S4 are each composed of a power element such as an IGBT, and are sequentially connected in series with their respective collectors located on the upstream side. The collector of the most upstream switching element S1 is connected to the positive output terminal on the high-voltage side of the converter 10, and is connected to the positive line of the high-voltage side.

The emitter of the switching element S1 is connected to the collector of the switching element S2. The emitter of the switching element S2 is connected to the collector of the switching element S3. The emitter of the switching element S3 is connected to the collector of the switching element S4. The emitter of the switching element S4 is connected to the negative line. The negative line is connected to ground.

Each of the switching elements S1-S4 is connected in parallel to a respective one of diodes D1-D4, which causes a current to flow from the emitter toward the collector. The current through each of the diodes D1-D4 flows in a direction opposite to the flow of current through the switching elements S1-S4.

A first low-voltage-side circuit 50 is connected between a connection point (node N2), which connects the switching element S2 and the switching element S3 of the converter 10, and the ground. Further, between a connection point (node N1) connecting the switching element S1 and the switching element S2, and a connection point (node N3) connecting the switching element S3 and the switching element S4, a second low-voltage-side circuit 52 is connected.

The first low-voltage-side circuit 50 includes a reactor L1 and a capacitor CL1, and is connected via a system main relay SMR1 to the battery B1 serving as a first DC power source.

The system main relay SMR1 is composed of relays SMR1-1 and SMR1-2 each having a first end connected to the negative terminal of the battery B1, and a relay SMR1-3 having a first end connected to the positive telininal of the battery B1. A resistor R for limiting current is connected in series to SMR1-1. The series connection of SMR1-1 and resistor R is connected in parallel to SMR1-2, and their respective second ends are connected to the ground.

A second end of SMR1-3 is connected via the reactor L1 to the node N2. The capacitor CL1 is connected between a connection point, which connects the second end of SMR1-3 and the reactor L1, and the ground.

The resistor R is a resistor for preventing inrush current into the capacitor CL1. When SMR1-3 and SMR1-1 are turned on, a current limited by the resistor R flows into the capacitor CL1. When the voltage difference between the capacitor CL1 and the battery B1 falls below a predetermined value so that there is no longer risk of inrush current, SMR1-1 is turned off and SMR1-2 is turned on, creating a parallel connection between the battery B1 and the capacitor CL1.

The second low-voltage-side circuit 52 basically has a configuration identical to the first low-voltage-side circuit 50. The positive and negative terminals of the battery B2 are connected in parallel to a capacitor CL2 via a system main relay SMR2. The positive side of the capacitor CL2 and the battery B2 is connected to the node N1 via a reactor L2, while the negative side of the capacitor CL2 and the battery B2 is connected to the node N3.

The control unit 30 is supplied with various signals such as manipulation signals of an axle, a brake, and the like, and signals indicating the state of charge (SOC) of the batteries B1, B2, vehicle velocity, and the like. Based on the various supplied signals such as the manipulation signals, the control unit 30 performs controls such as ON/OFF control of the switching elements in the inverter 20 and the converter 10, and drive control of the engine 42, so as to control travel and the like of the vehicle. As these controls are general controls, they are not described in detail herein.

The control unit 30 receives, from an air pressure sensor 32, a signal concerning air pressure of the ambient air around the vehicle. When the air pressure is low, electrical breakdown can be easily generated in the motor generators MG1, MG2. Accordingly, when the air pressure is low, insulation degradation due to electric discharge would tend to occur in the motor generators MG1, MG2. For this reason, when the air pressure is low, the control unit 30 controls an operation mode of the converter 10 so that the high-voltage-side voltage VH does not become too high.

Further, the control unit 30 receives, from a temperature sensor 34, a signal concerning temperature of a cooling water of the inverter 20, as the inverter temperature signal. More specifically, a cooler 22 is coupled to the inverter 20, and a coolant such as cooling water or the like in a coolant tank 24 is circulated through the cooler 22 via a pump 26. The cooling water is preferably cooled by being circulated through a radiator or the like. Normally, the cooler 22 includes a metallic heat sink for mounting thereon a substrate having the switching elements of the inverter 20, and a coolant circulation channel inside this heat sink. The temperature sensor 34 can have any form so long as it can detect the temperature of the switching elements of the inverter 20, and may be attached to a switching element or the substrate of the switching elements.

In the switching elements of the inverter 20, the withstand voltage decreases as the temperature increases. For this reason, when the cooling water temperature is high, the control unit 30 controls the operation mode of the converter 10 such that the high-voltage-side voltage VH does not become too great.

Furthermore, the control unit 30 detects, based on a state of operation of the inverter 20, a locked state of the motor generators MG1 and MG2, especially of the motor generator MG2 provided for drive purpose. More specifically, when the motor generator MG2 is unable to rotate and is locked up, such as due to presence of a rotational load applied to the wheels 44 or such a reason, current flow is repeated in one single phase of the inverter. Consequently, the temperature of the switching element through which current flow is repeated increases, and its withstand voltage falls. Accordingly, the control unit 30 detects a lockup of the motor generators MG1, MG2 from a state of control of the inverter 20, and when the motor generator MG1 or MG2 is in a locked state, the control unit 30 executes control so that the high-voltage-side voltage VH does not become excessively high.

Operation Modes

The converter 10 of the present embodiment can implement various operation modes by placing the switching elements S1-S4 in specific switching states and thereby placing the batteries B1, B2 in a series or parallel connection with each other. With these operation modes, the high-voltage-side voltage VH on the output side of the converter 10 can be controlled over a wide range, whereby effective control of the motor generators MG1, MG2 can be achieved. The various operation modes are now described. In the following description, a powering instance denotes a state in which electric power is output from the inverter 20 toward the motor generators MG1, MG2. A regenerating instance denotes a state in which electric power is output from the inverter 20 toward the converter 10, and includes an instance of electric power generation.

Series Connection Mode: With No Voltage Boost

Figure 2A:
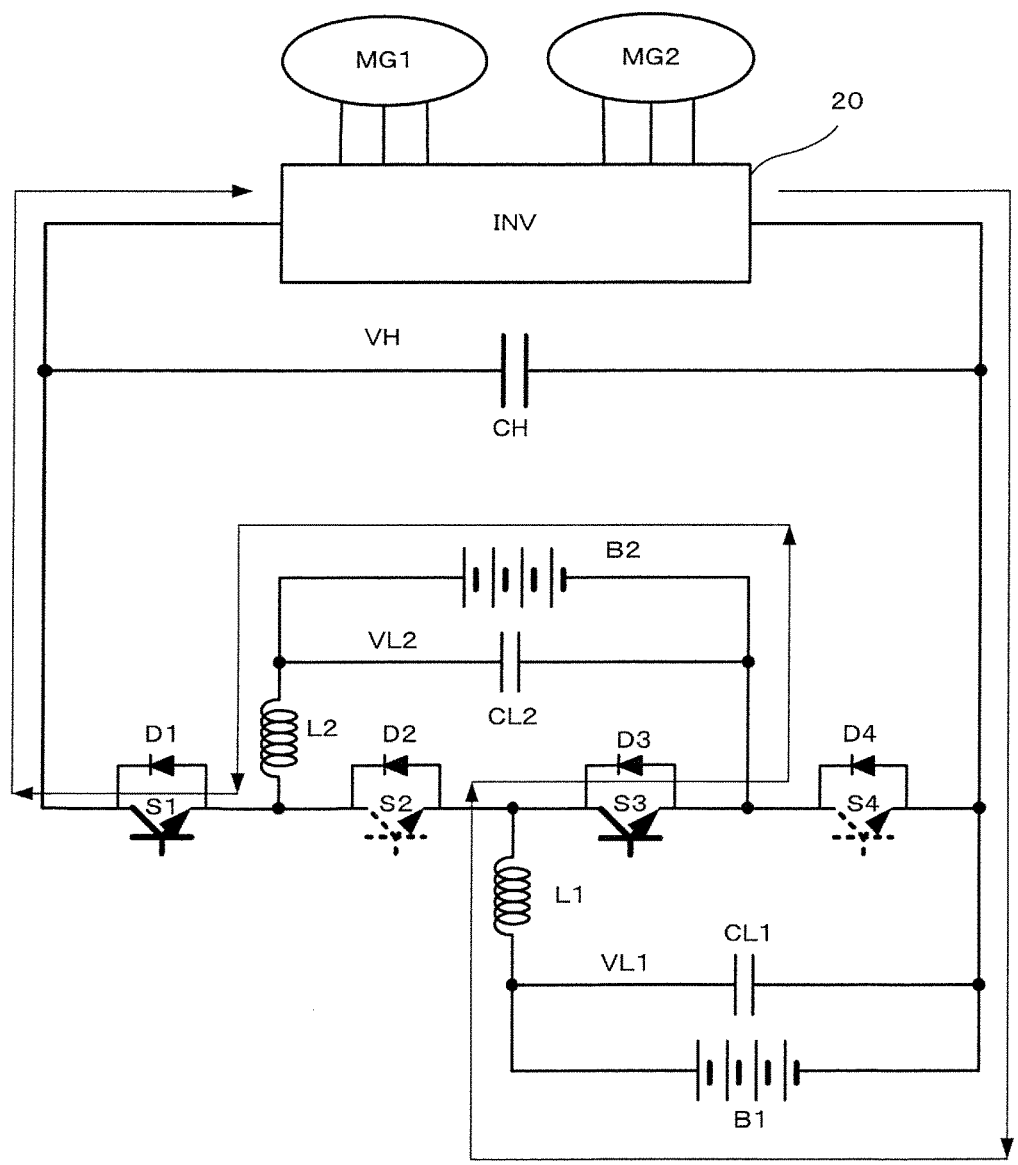
FIG. 2A is a diagram showing a converter operation state (series connection, with no voltage boost)
Figure 2B:
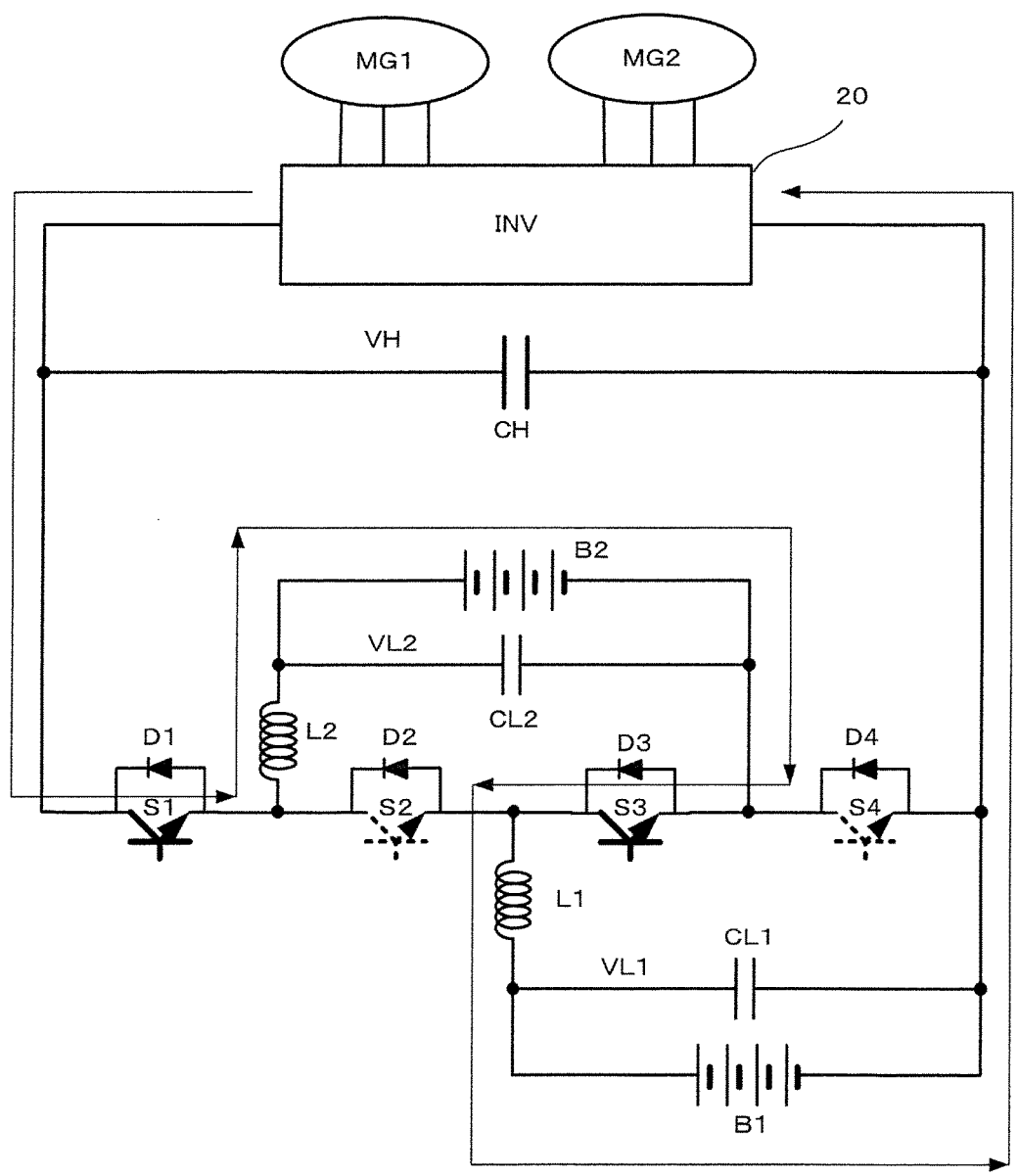
FIG. 2B is a diagram showing a converter operation state (series connection, with no voltage boost)

FIGS. 2A and 2B show a mode in which the two batteries B1, B2 are simply connected in series. In the drawings referred to in the following, a switching element drawn in bold solid lines indicate that the switching element is fixed to the ON state, and a switching element drawn in bold dashed lines indicate that the switching element is fixed to the OFF state. Further, a switching element drawn in thin solid lines indicate that the switching element is momentarily in the ON state in the course of an ON/OFF operation, and a switching element drawn in thin dashed lines indicate that the switching element is momentarily in the OFF state in the course of an ON/OFF operation.

(Powering Instance)

FIG. 2A shows a situation in which the voltage of the series connection of the batteries B1, B2 (=(voltage VL1 of the capacitor CL1)+(voltage VL2 of the capacitor CL2)) is higher than the voltage VH on the high-voltage side (i.e., the voltage charged in the capacitor CH). Current flows from the batteries B1, B2 toward the capacitor CH (or the inverter 20).

In this case, the switching element S2 is fixed to OFF, the switching element S3 is fixed to ON, and the switching element S4 is fixed to OFF. The switching element Si may be either turned ON or turned OFF.

(Regenerating Instance)

FIG. 2B shows a situation in which the voltage of the series connection of the batteries B1, B2 is higher than the voltage charged in the capacitor CH, which may be a state during regenerative braking. Current flows from the VH side toward the series connection of the batteries B1, B2.

In this case, the switching element S2 is fixed to OFF, the switching element S3 is fixed to ON, and the switching element S4 is fixed to OFF. Further, the switching element S1 is turned ON.

By maintaining the switching element Si in the ON state, the direction of the current becomes determined by the relationship between the high-voltage-side voltage VH and the low-voltage-side voltage VL1+VL2. Under ordinary conditions, the motor generator MG2 is driven in a state in which VL1+VL2>VH holds true. During regenerative braking or during electric power generation by the motor generator MG1, VL1+VL2<VH holds true, and charging of the batteries B1 and B2 is carried out.

Series Connection Mode: With Voltage Boost

Figure 3A:
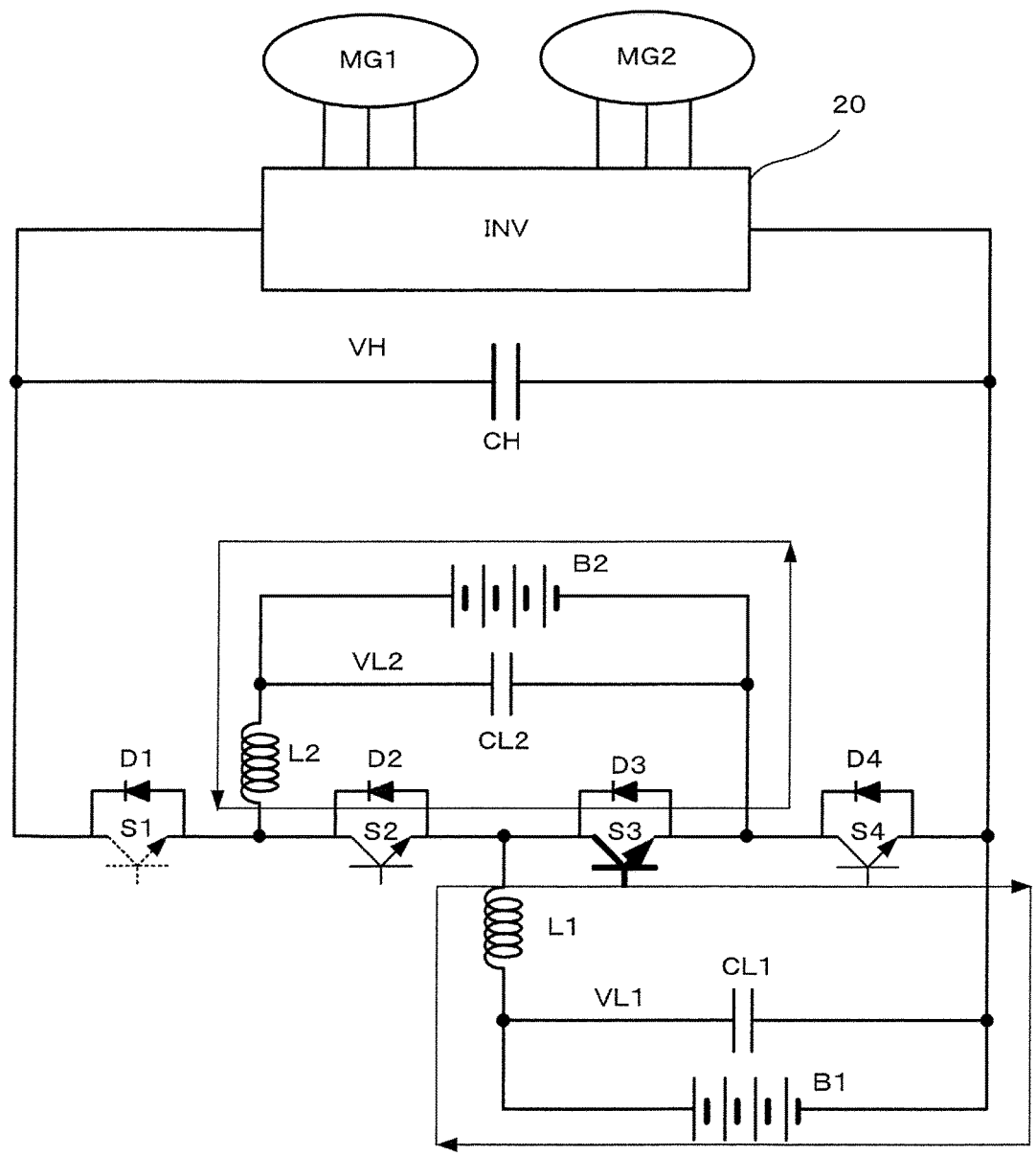
FIG. 3A is a diagram showing a converter operation state (series connection, with voltage boost)
Figure 3B:
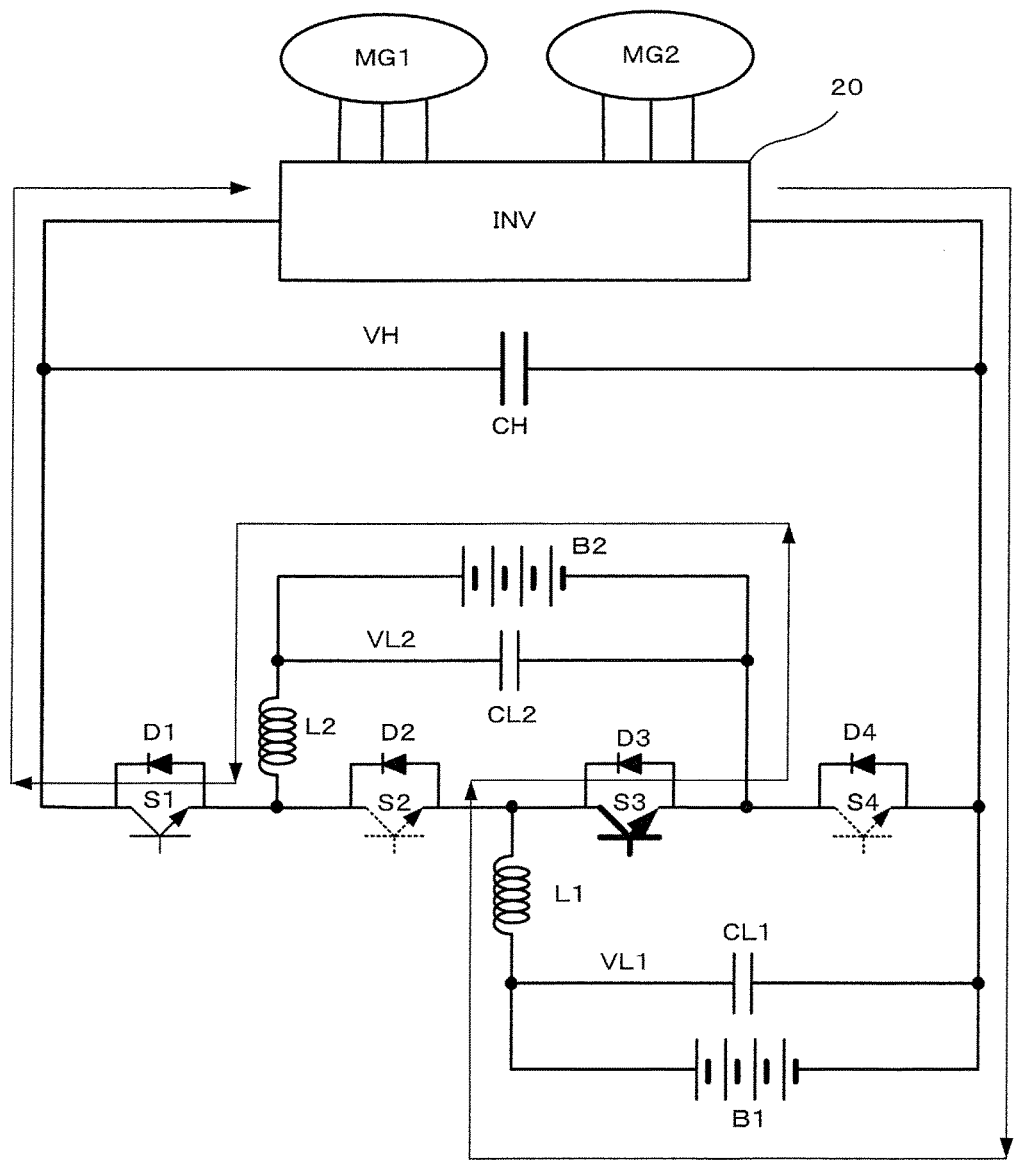
FIG. 3B is a diagram showing a converter operation state (series connection, with voltage boost)
Figure 3C:
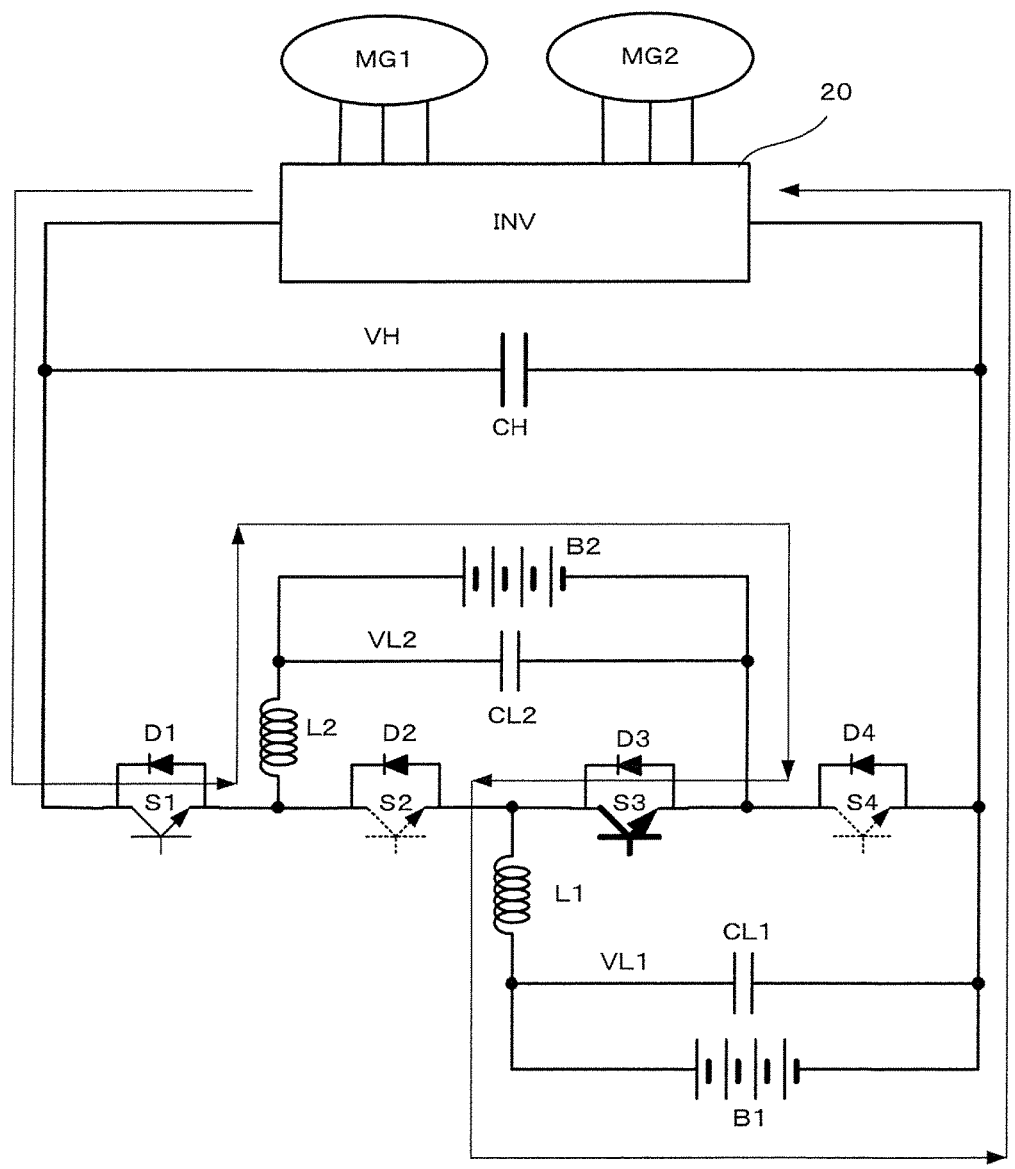
FIG. 3C is a diagram showing a converter operation state (series connection, with voltage boost)
Figure 3D:
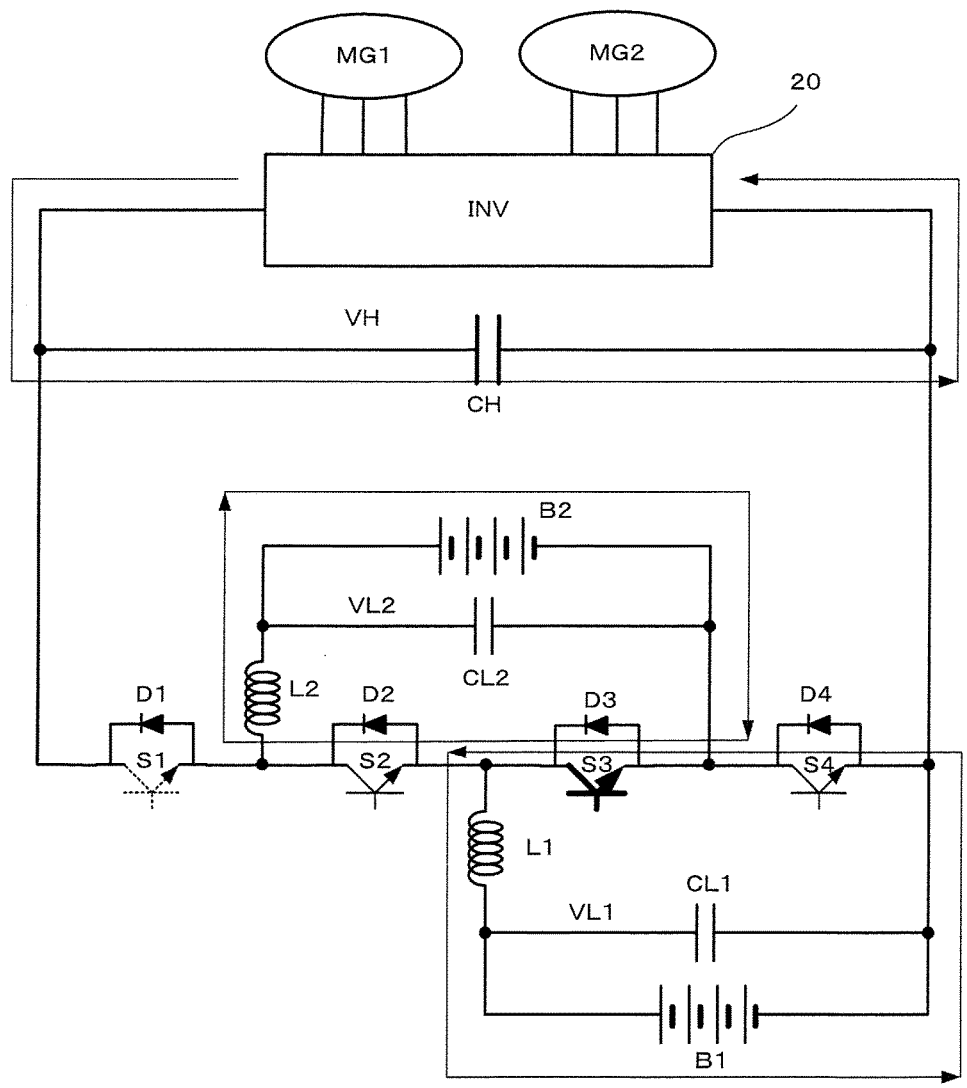
FIG. 3D is a diagram showing a converter operation state (series connection, with voltage boost)

FIGS. 3A and 3B relate to a mode in which voltage boost is to be performed while the batteries B1, B2 are connected in series, and show a state during a powering instance. Further, FIGS. 3C and 3D show a state during a regenerating instance. As shown, ON/OFF operations of the switching elements S1, S2, and S4 are performed while fixing the switching element S3 to ON.

(Powering Instance)

In FIG. 3A, the switching element Si is turned OFF, and the switching elements S2, S3, and S4 are turned ON. In this state, current from the battery B1 flows through the reactor L1 and the switching elements S3, S4, and current from the battery B2 flows through the reactor L2 and the switching elements S2, S3. As a result, energy is accumulated in the reactors L1, L2.

From the state shown in FIG. 3A, the switching element S1 is turned ON, and the switching elements S2, S4 are turned OFF. As a result, as shown in FIG. 3B, current flows toward the high-voltage side due to the energy accumulated in the reactor L1 and the energy accumulated in the reactor L2. More specifically, a circuit connecting the battery B1, the reactor L1, the switching element S3, the battery B2, the reactor L2, and the diode D1 is formed between the negative line and positive line on the high-voltage side, and current from the reactors L1, L2 flows toward the high-voltage side.

By repeatedly alternating the states shown in FIGS. 3A and 3B, voltage of the series connection of the batteries B1, B2 can be boosted and output to the high-voltage side.

(Regenerating Instance)

In FIG. 3C, the switching elements S1, S3 are turned ON, and the switching elements S2, S4 are turned OFF. In this state, current from the high-voltage side flows through the switching element S1, the reactor L2, the battery B2, the diode D3, the reactor L1, and the battery B1, and to the ground. As a result, current from the high-voltage side flows into and charges the batteries B1, B2 on the low-voltage side, and also causes energy to be accumulated in the reactors L1, L2.

From the state shown in FIG. 3C, the switching element S1 is turned OFF, and the switching elements S2, S4 are turned ON. As a result, as shown in FIG. 3D, due to the energy accumulated in the reactor L1, current flows from the negative terminal side of the battery B1 through the diodes D4, D3 and the reactor L1, and toward the positive terminal side of the battery B1. Furthermore, due to the energy accumulated in the reactor L2, current flows from the negative terminal side of the battery B2 through the diodes D3, D2 and the reactor L2, and toward the positive terminal side of the battery B2.

During regenerative braking or the like, current from the high-voltage side flows to the low-voltage side, and charging of the batteries B1, B2 is performed in this manner. In the mode of FIGS. 3A-3D, the duty ratio of the switching element S1 is equal to (VL1+VL2)/VH, and the duty ratio of the switching elements S2, S4 is equal to 1−(VL1+VL2)/VH.

Parallel Connection Mode: with Voltage Boost

Figure 4A:
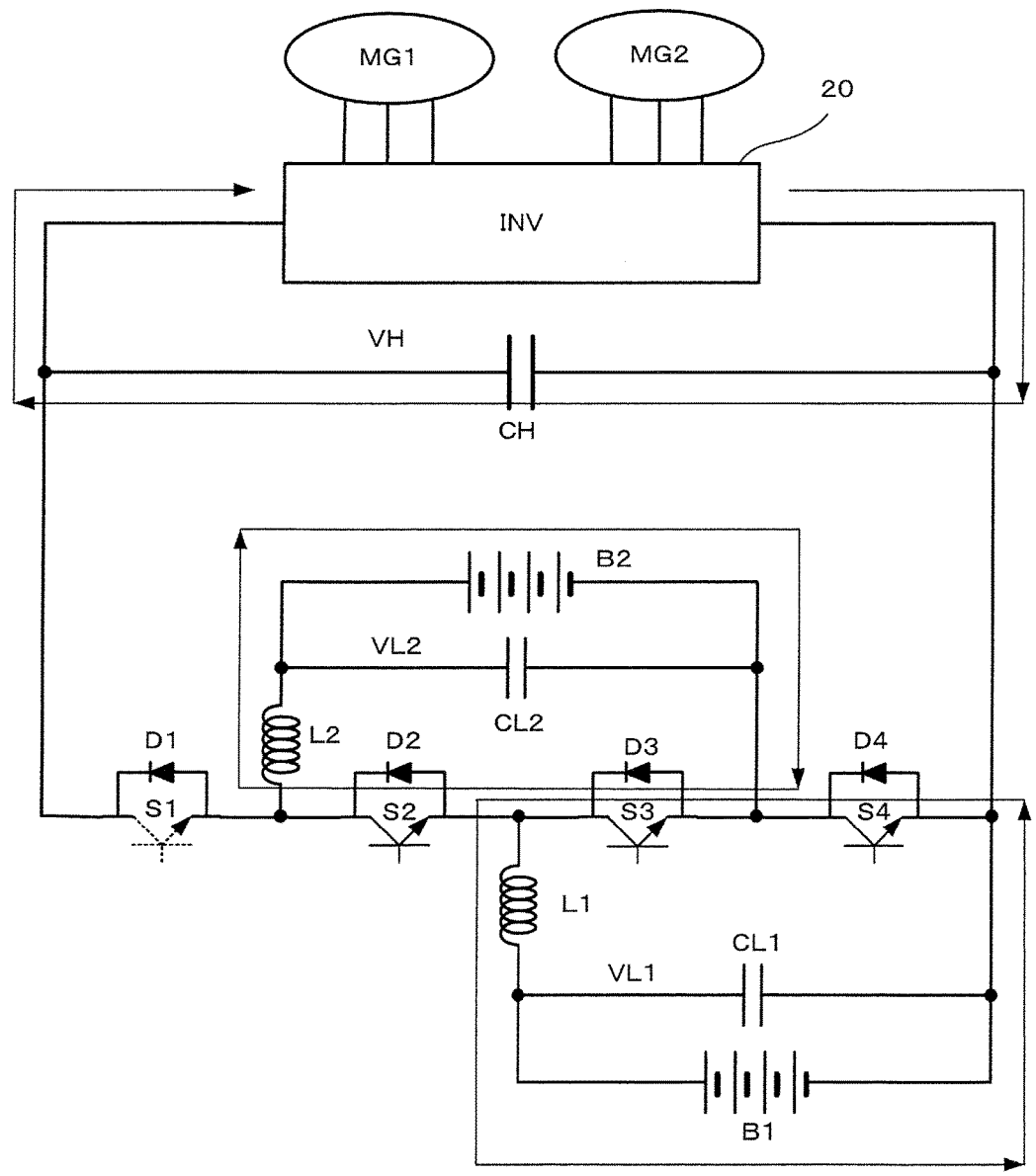
FIG. 4A is a diagram showing a converter operation state (parallel connection, with voltage boost)
Figure 4B:
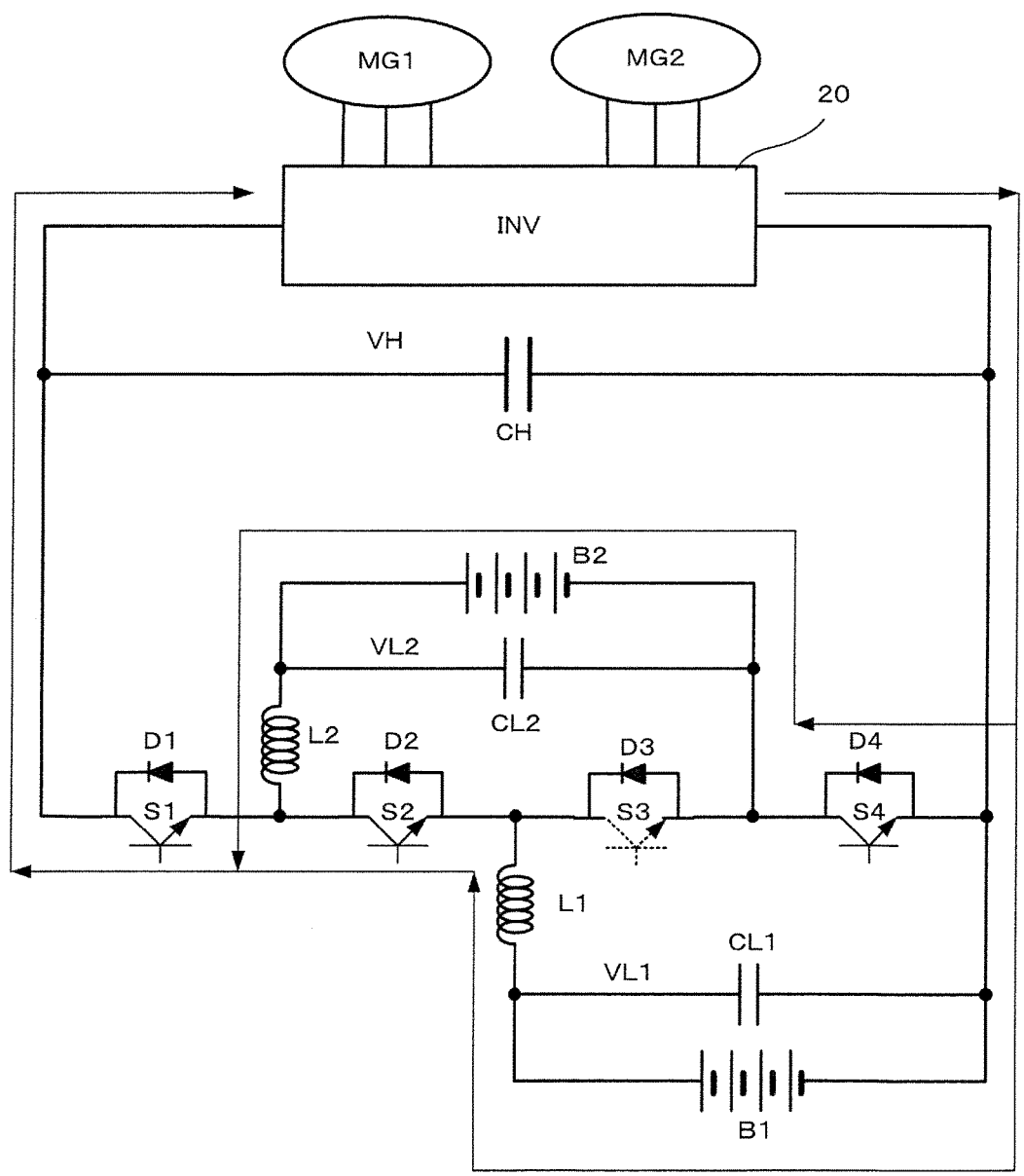
FIG. 4B is a diagram showing a converter operation state (parallel connection, with voltage boost)
Figure 4C:
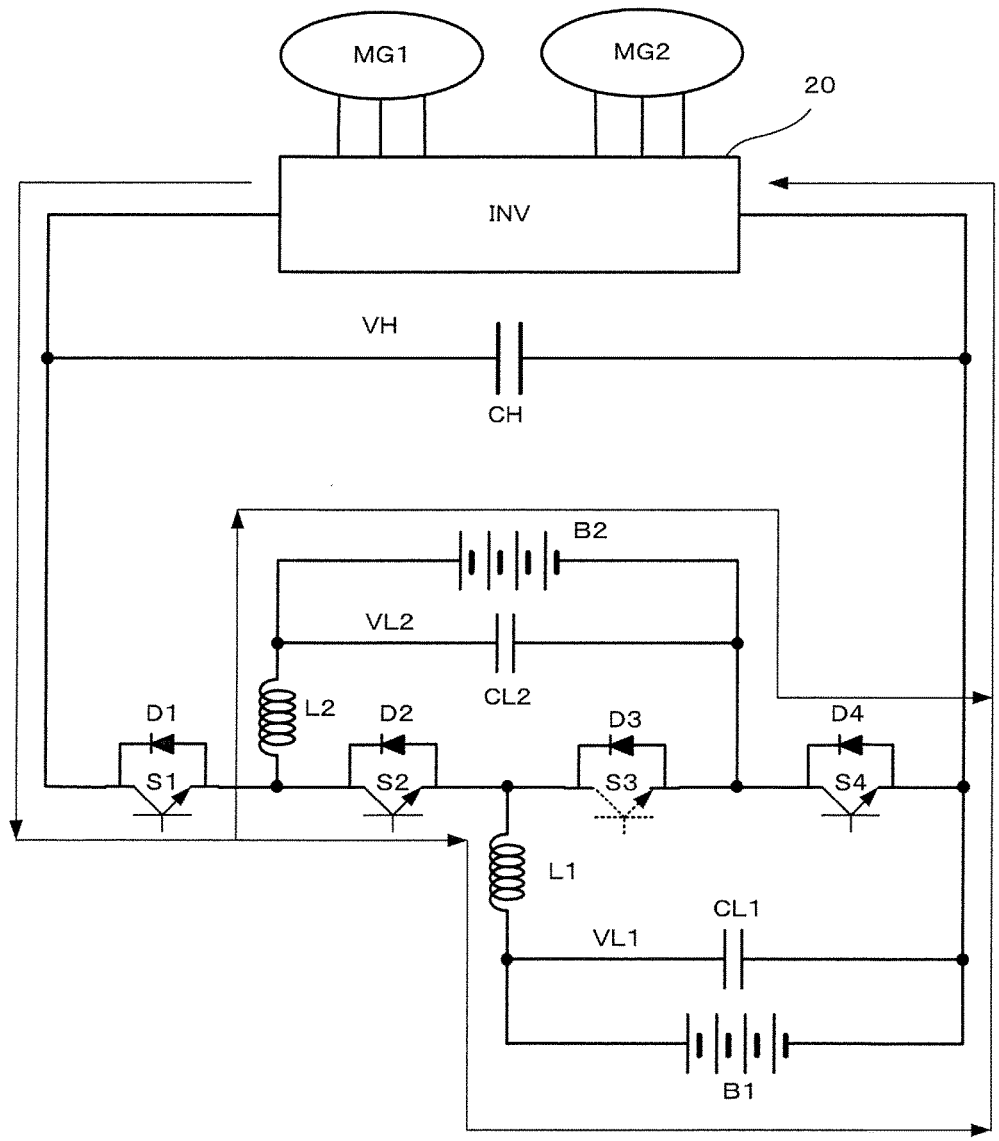
FIG. 4C is a diagram showing a converter operation state (parallel connection, with voltage boost)
Figure 4D:
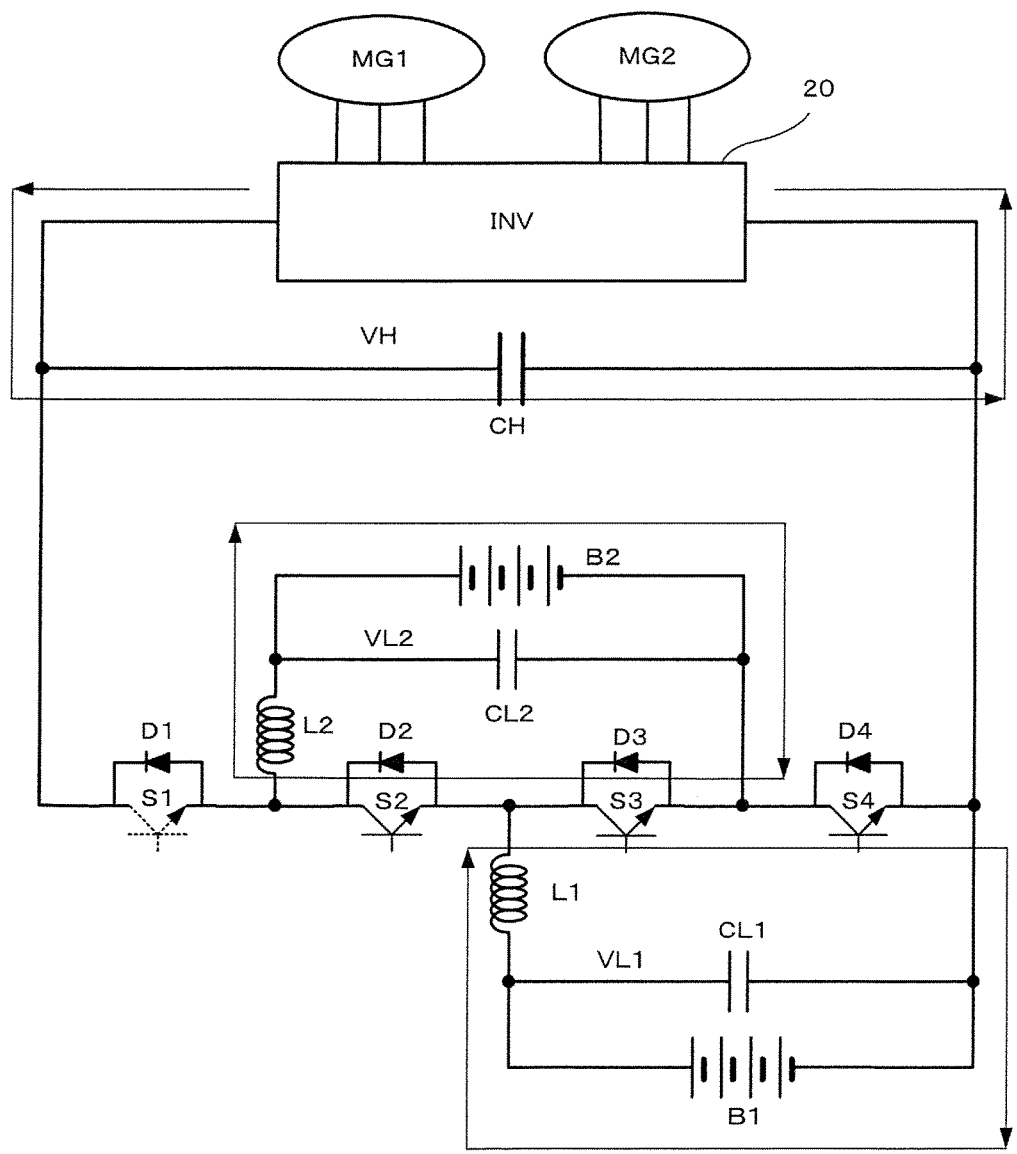
FIG. 4D is a diagram showing a converter operation state (parallel connection, with voltage boost)

FIGS. 4A and 4B relate to a mode in which voltage boost is to be performed while the batteries B1, B2 are connected in parallel, and show a state during a powering instance. Further, FIGS. 4C and 4D show a state during a regenerating instance.

In this mode, basically, ON/OFF operations of the switching elements S1, S3 are performed while fixing the switching elements S2, S4 to ON.

(Powering Instance)

In FIG. 4A, the switching element S1 is turned OFF, and the switching elements S2, S3, S4 are turned ON. In this state, current from the battery B1 flows through the reactor L1 and the switching elements S3, S4, and current from the battery B2 flows through the reactor L2 and the switching elements S2, S3. As a result, energy is accumulated in the reactors L1, L2.

From the state shown in FIG. 4A, the switching element S3 is turned OFF. As a result, as shown in FIG. 4B, due to the energy accumulated in the reactor L1, current from the reactor L1 flows via the diodes D2, D1 to the high-voltage side. Furthermore, due to the energy accumulated in the reactor L2, current from the reactor L2 flows via the diode D1 to the high-voltage side.

In this way, voltage boost is performed while the batteries B1, B2 are connected in parallel. Here, in the state shown in FIG. 4B, the switching elements S1, S4 may alternatively be turned OFF.

(Regenerating Instance)

In FIG. 4C, the switching elements S1, S2, S3 are turned ON, and the switching element S3 is turned OFF. In this state, current from the high-voltage side flows through the switching element S1, the reactor L2, the battery B2, and the switching element S4 and to the ground, and also through the switching elements S1, S2, the reactor L1, and the battery B1, and to the ground.

From the state shown in FIG. 4C, the switching element S1 is turned OFF, and the switching element S3 is turned ON. As a result, as shown in FIG. 4D, due to the energy accumulated in the reactor L1, current from the reactor L1 flows from the positive terminal side to the negative terminal side of the battery B1, and current from the ground flows through the diodes D4, D3 and toward the reactor L1. Furthermore, due to the energy accumulated in the reactor L2, current from the reactor L2 flows from the positive terminal side to the negative terminal side of the battery B2, and through the diodes D3, D2 toward the reactor L2.

In this way, the batteries B1, B2 become charged while being connected in parallel.

Single Connection Mode: With Voltage Boost

Figure 5A:
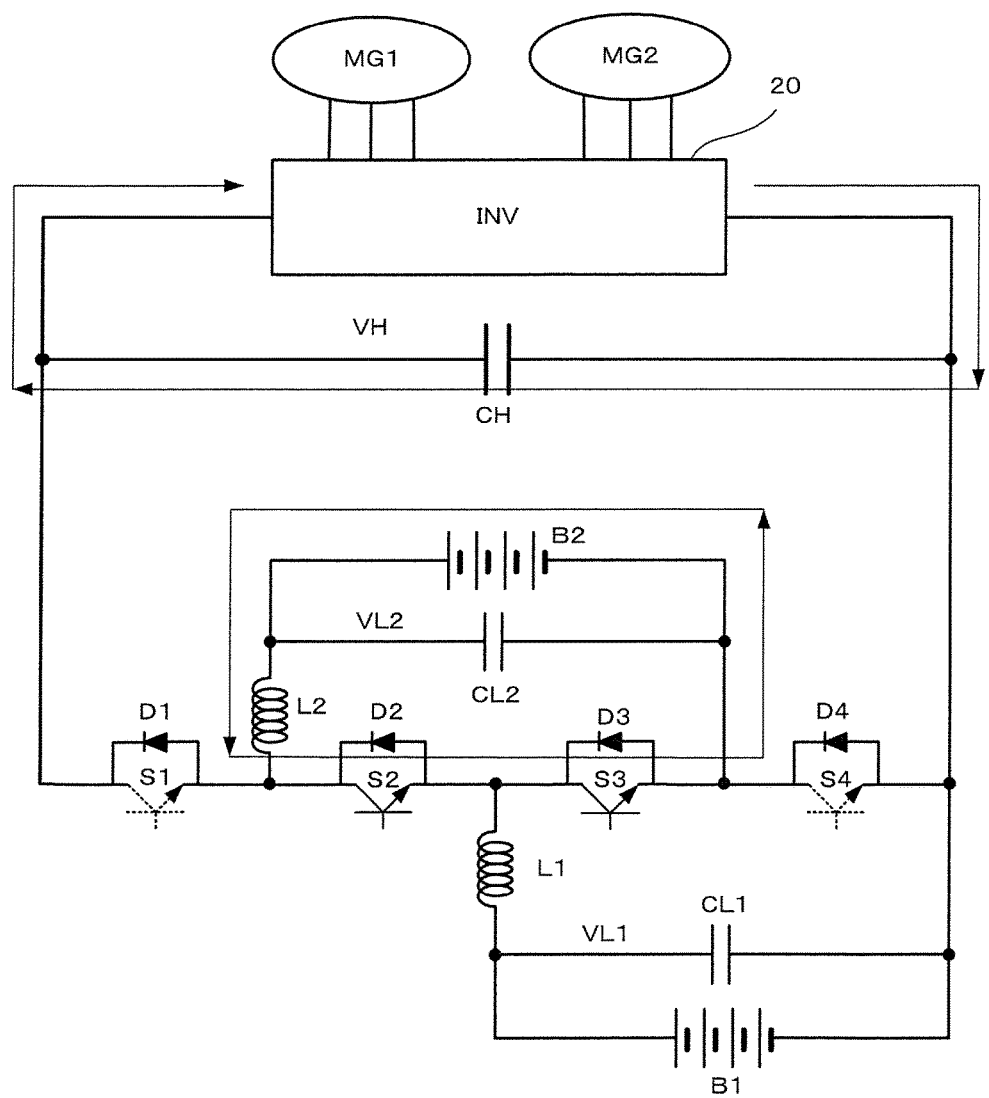
FIG. 5A is a diagram showing a converter operation state (single, using B2)
Figure 5B:
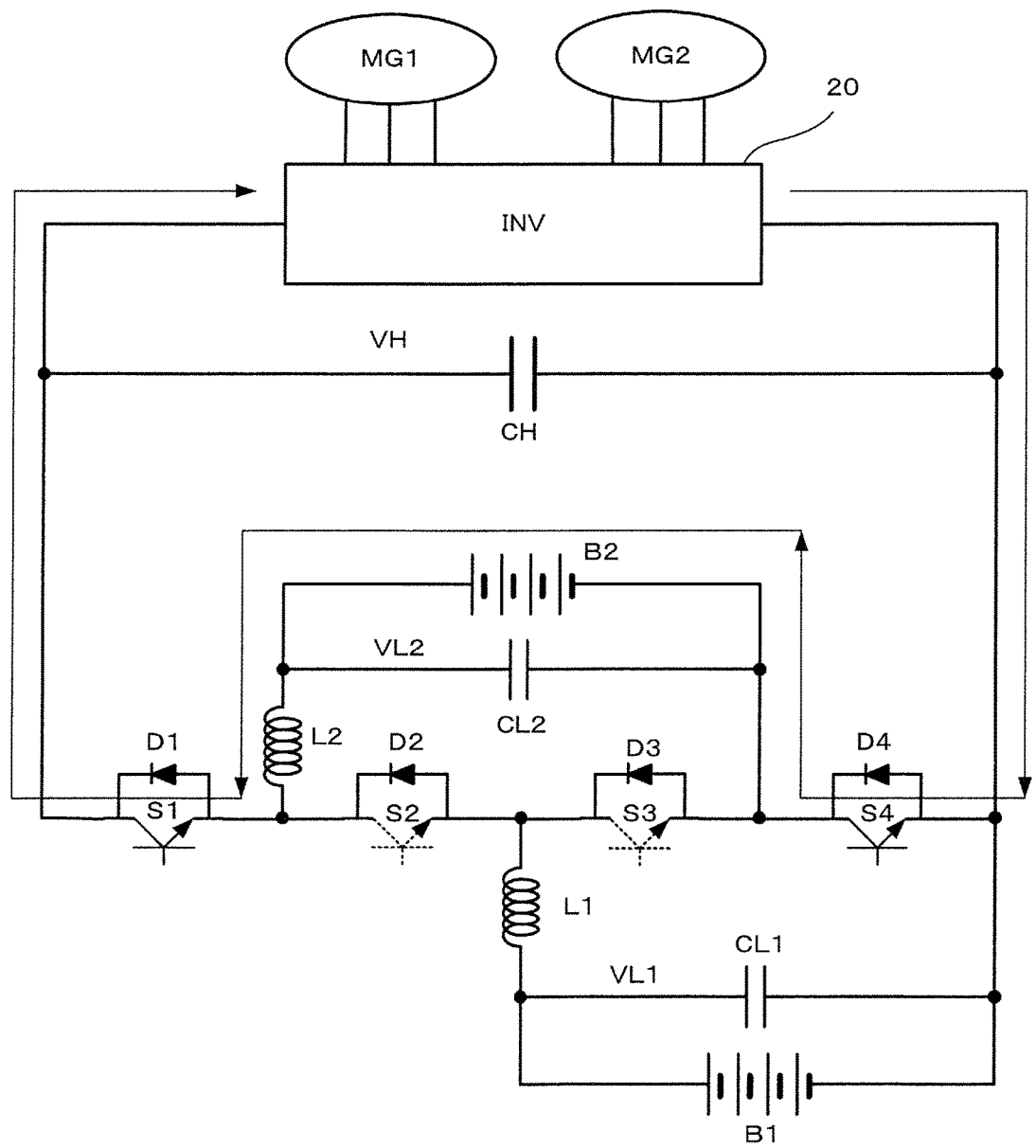
FIG. 5B is a diagram showing a converter operation state (single, using B2)

It is also possible to use only one of the batteries B1, B2. FIGS. 5A and 5B illustrate a case in which only the battery B2 is used and an output voltage of the battery B2 is to be boosted. In FIG. 5A, the switching elements S1, S4 are turned OFF while the switching elements S2, S3 are turned ON, and current from the battery B2 flows into the reactor L2. From this state, as shown in FIG. 5B, the switching elements S1, S4 are turned ON, and the switching elements S2, S3 are turned OFF. As a result, due to the energy accumulated in the reactor L2, current from the ground side flows through the diode D4, the battery B2, the reactor L2, and the diode D1, and to the high-voltage side.

The voltage boost can be carried out by performing ON/OFF operations of the switching elements S2, S3. Accordingly, in the state shown in FIG. 5B, the switching elements S1, S4 may alternatively be turned OFF. However, in view of a regenerating instance, ON/OFF operations of the switching elements S1, S4 are performed.

During a regenerating instance, in the state shown in FIG. 5B, current flows in the direction opposite to that shown. When the circuitry is subsequently place in the state shown in FIG. 5A, current flows in the direction opposite to that shown.

Figure 5C:
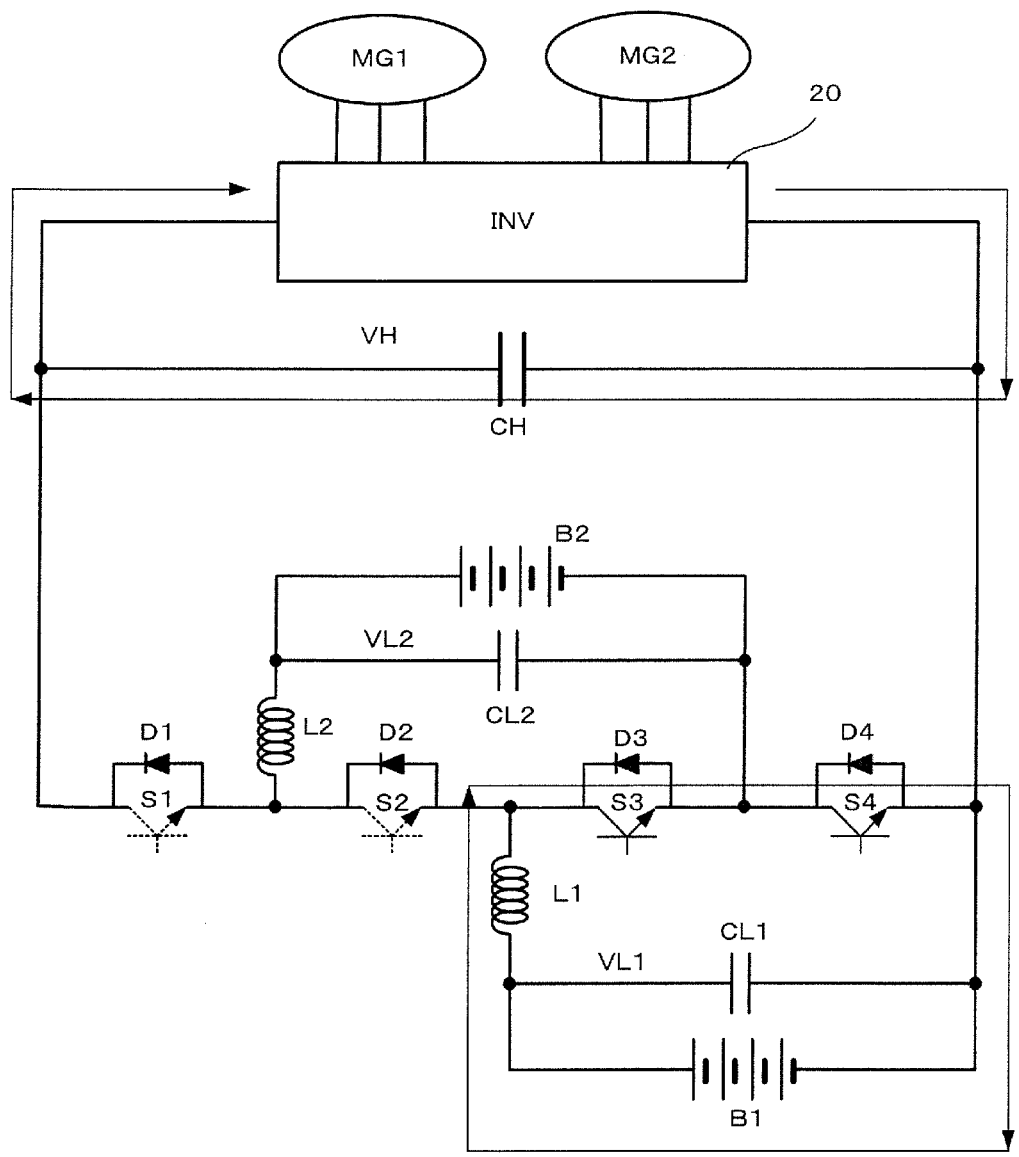
FIG. 5C is a diagram showing a converter operation state (single, using B1)
Figure 5D:
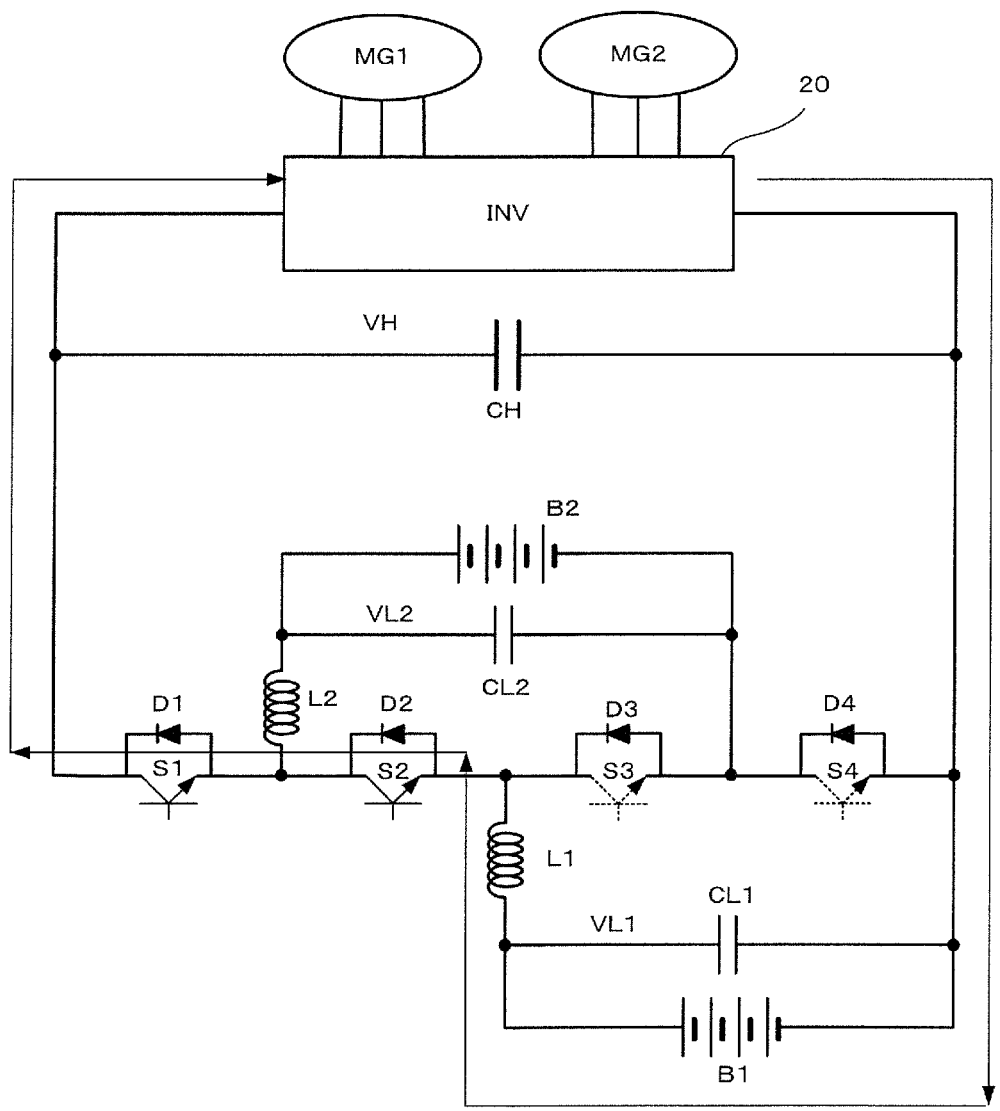
FIG. 5D is a diagram showing a converter operation state (single, using B1)

FIGS. 5C and 5D illustrate a case in which only the battery B1 is used and an output voltage of the battery B1 is boosted.

As can be seen, the voltage boost can be carried out basically by performing ON/OFF operations of the switching elements S3, S4. By also performing ON/OFF operations of the switching elements S1, S2, current flow in the opposite direction during a regenerating instance is ensured.

Control for Switching Operation Modes

As described above, in the present embodiment, when operating the converter 10, it is possible to configure the two batteries B1, B2 on the low-voltage side to be connected in series or in parallel, or to configure such that only one of the batteries is used. Accordingly, an appropriate operation mode can be selected in accordance with outputs from the motor generators MG1, MG2, temperature of the switching elements in the inverter 20, and the like.

Meanwhile, in the operation modes in which the batteries B1, B2 are connected in series, the minimum voltage on the output side of the converter is basically equal to a value obtained by adding the voltages of the two batteries B1, B2. For this reason, depending on the conditions of the motor generators MG1, MG2 and the inverter 20, there may be situations in which a voltage applied to these elements becomes too high.

According to the present embodiment, occurrence of such situations is prevented in the control unit 30.

Air Pressure

Figure 6:
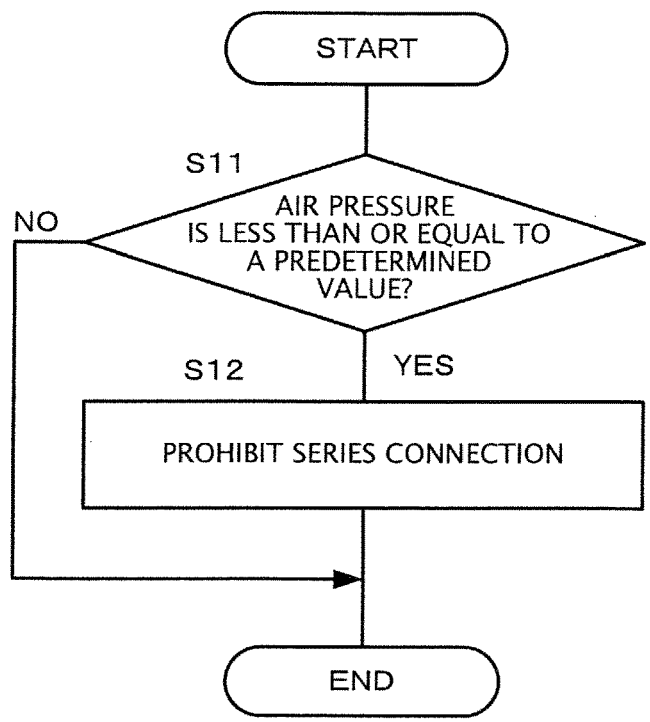
FIG. 6 is a flowchart showing an example process performed in accordance with air pressure.

In the present embodiment, the air pressure sensor 32 detects the air pressure of a surrounding environment in which the vehicle is located (or travelling), and supplies the detected air pressure value to the control unit 30. Subsequently, a control process as shown in FIG. 6 is performed.

First, based on the detected air pressure, the control unit 30 determines whether or not the air pressure is less than (less than or equal to or simply less than) a predetermined value (S11). When the determination is NO, the process is ended because it is determined that no problem is present. On the other hand, when it is determined YES in S11, the control unit 30 prohibits series connection of the batteries B1, B2 (S12).

As described above, when the air pressure is low, electricity can be easily discharged through the atmosphere, so that, in the motor generators MG1, MG2 and the like, an electric discharge would be more easily generated between a part having a negative potential and a part having a positive potential. For this reason, an upper limit application voltage, which is a voltage above which insulation degradation due to electric discharge becomes easily generated, is determined based on the specifications of the motor generators MG1, MG2 and other factors, and when the general voltage of the series connection of the batteries B1, B2 exceeds this upper limit application voltage, the series connection is prohibited. As a result, generation of malfunctions in the motor generators MG1, MG2 can be prevented. In other words, when the air pressure is relatively low for any reason, such as, for example, the vehicle is traveling at a high altitude, the series connection mode is entirely prohibited without considering the voltages of the batteries B1, B2 at that time.

Here, the air pressure value is not necessarily detected by a barometer provided on the vehicle, but alternatively may be acquired from an external information center or the like via communication. Further, since large changes in air pressure often result from changes in altitude, the air pressure value may be estimated from current location data obtained using GPS or the like. It is also possible to transmit the current location to an information center and in turn acquire altitude data and data concerning the air pressure.

Figure 7:
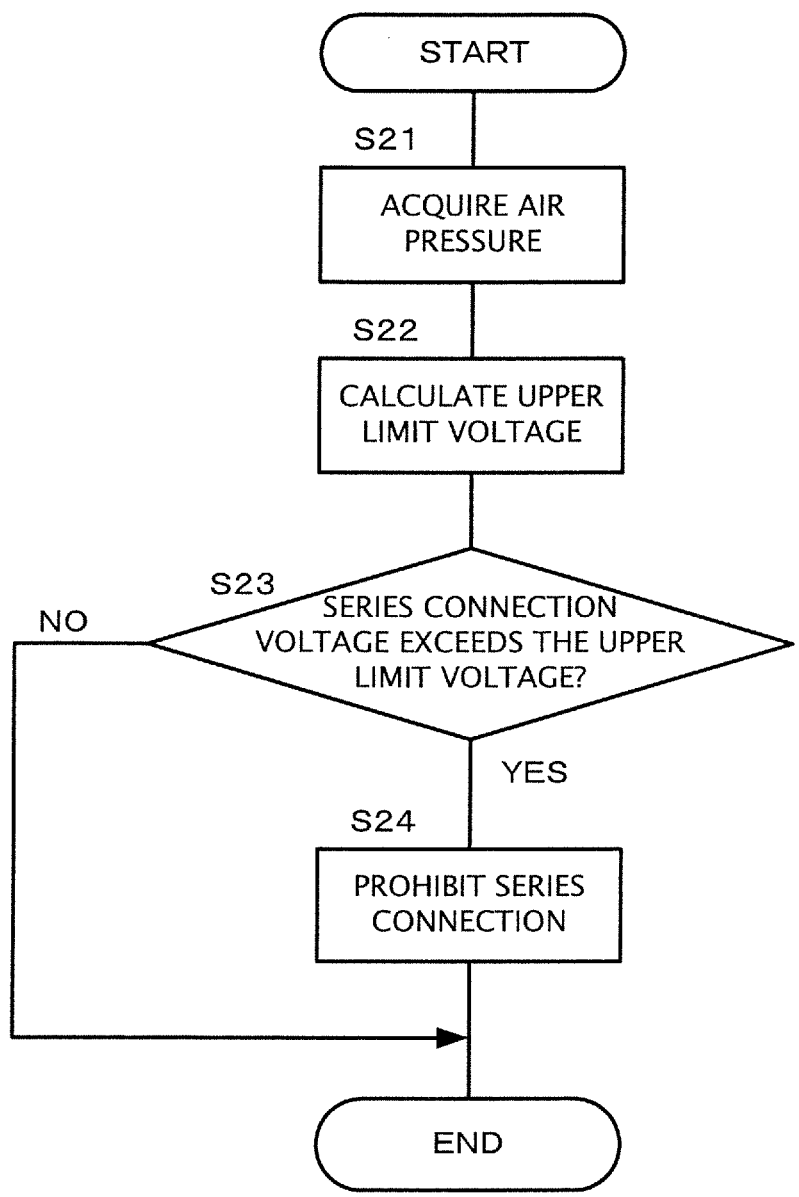
FIG. 7 is a flowchart showing another example process performed in accordance with air pressure.

FIG. 7 shows a process performed in a case in which the voltages of the batteries B1, B2 are to be actually detected. First, the air pressure is acquired from the air pressure sensor 32 (S21). Subsequently, based on the acquired air pressure, an upper limit voltage of the motor generators MG1, MG2 corresponding to the detected air pressure is calculated using a map or the like indicating applicable upper limit voltage values corresponding to air pressure values (S22). In other words, a voltage (upper limit voltage) above which insulation degradation due to electric discharge becomes easily generated in the motor generators MG1, MG2 is calculated.

Next, it is determined whether or not the series connection voltage, which is the voltage obtained with the series connection (the total voltage of the batteries B1, B2), exceeds (or is higher than or equal to) the upper limit voltage corresponding to the detected air pressure (S23). When the determination is NO, the process is ended at that point; when YES, operation in the series connection mode is prohibited (S24). In this way, it is possible to prevent operation with the high-voltage-side voltage VH exceeding the upper limit voltage.

Even when the batteries B1, B2 are not connected in series, it is undesirable if the high-voltage-side voltage VH exceeds the upper limit voltage applicable to the motor generators MG1, MG2. Accordingly, it is in other operation modes also preferable to control the converter 10 such that the high-voltage-side voltage VH does not exceed the upper limit voltage.

While situations may differ depending on how the upper limit voltage is set, there are situations in which no problem will result as long as the time during which the high-voltage-side voltage VH exceeds the upper limit voltage remains sufficiently short. In such cases, frequency of the instances in which high-voltage-side voltage VH exceeds the upper limit voltage may be reduced by simply prohibiting the series connection mode as described above.

Further, instead of prohibiting the series connection mode of the batteries B1, B2, the frequency of transitions to the series connection mode may be reduced by configuring such that, during a judging process concerning operation mode transitions, a transition to the series connection mode is less easily permitted. Furthermore, without prohibiting the series connection mode itself, the duration of the series connection mode may be limited to a shorter time by providing a limitation to the duration upon transition to this mode.

Figure 8:
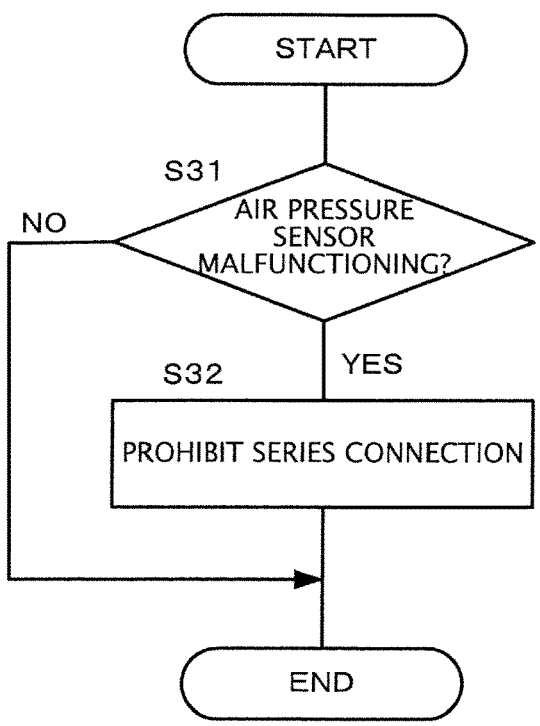
FIG. 8 is a flowchart showing a further example process performed in accordance with air pressure.

FIG. 8 shows another example. In this example, it is judged whether or not the air pressure sensor 32 is malfunctioning (S31). When the judged result is YES, series connection of the batteries B1, B2 is prohibited (S32). The judgment regarding whether or not the air pressure sensor 32 is malfunctioning can be made using various diagnostic functions. For example, presence of a malfunction can be judged by changing a voltage applied to a sensing part of the air pressure sensor, and then observing a change in the output or simply checking whether there is any change in the output.

According to the above process, it is possible to prevent operation with the high-voltage-side voltage VH being too high.

Figure 9:
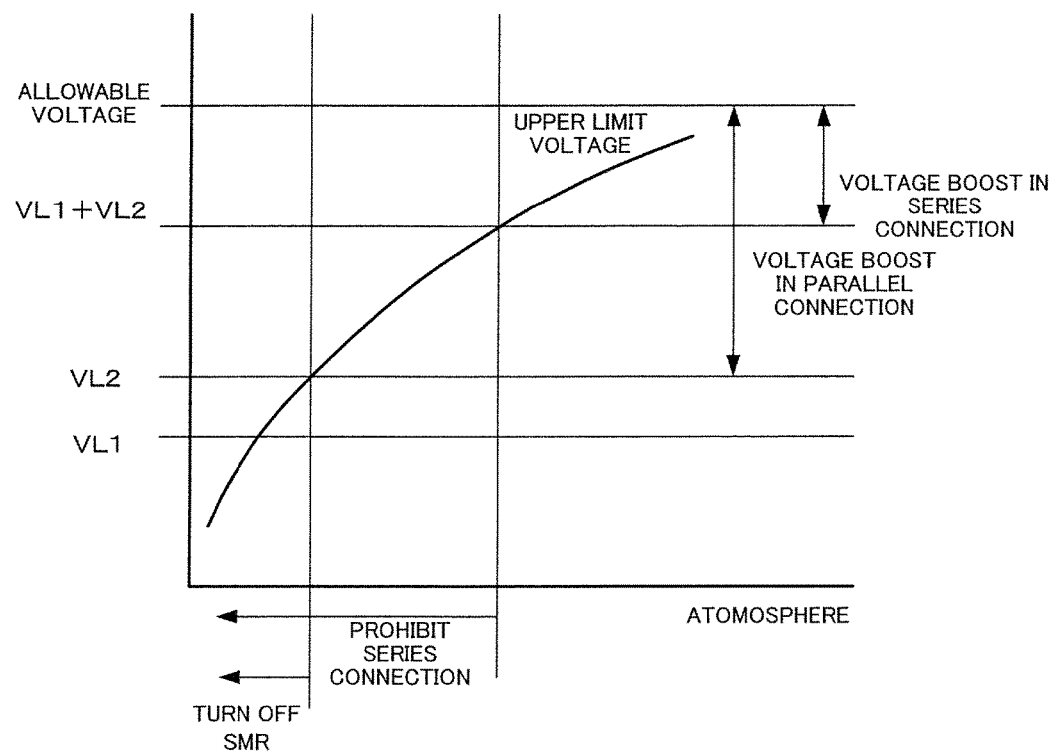
FIG. 9 is a diagram showing a relationship between air pressure and the upper limit voltage.

FIG. 9 shows a relationship between atmospheric pressure and the upper limit voltage value of the high-voltage-side voltage VH. As shown, as the atmospheric pressure decreases, the upper limit voltage also decreases. In the present embodiment, when the current atmospheric pressure reaches or falls below a threshold value at which the upper limit voltage falls below the voltage VL1+VL2 of the series connection of the batteries B1, B2, the series connection mode is prohibited. With this arrangement, it is possible to prevent the high-voltage-side voltage VH from exceeding the upper limit voltage corresponding to the current atmospheric pressure even when no voltage boost is pedal med.

Further, when the current atmospheric pressure is such that the upper limit voltage falls below the higher of the voltages of the batteries B1, B2 (in this case, VL2), the system main relay SMR (in this case, SMR2) of the corresponding battery B1 or B2 is turned OFF. Furthermore, when the current atmospheric pressure is such that the upper limit voltage also falls below the lower of the voltages of the batteries B1, B2, both of the system main relays SMR1, SMR2 are turned OFF. With this arrangement, it is possible to prevent the high-voltage-side voltage VH from exceeding the upper limit voltage corresponding to the current atmospheric pressure.

Here, a preset allowable voltage value is set for the high-voltage-side voltage VH, and this allowable voltage value serves as the upper limit for the voltage boost performed by the converter 10. When in the series connection mode, the voltage boost is performed from the voltage VL1+VL2 up to the allowable voltage. On the other hand, when in the parallel connection mode, the voltage boost range is the range from the higher of the voltages VL1, VL2 of the batteries B1, B2 to the allowable voltage. It is preferable to use the series connection mode when the target VH is high, and to use the parallel connection mode when the target VH is relatively low.

Inverter Temperature

Figure 10:
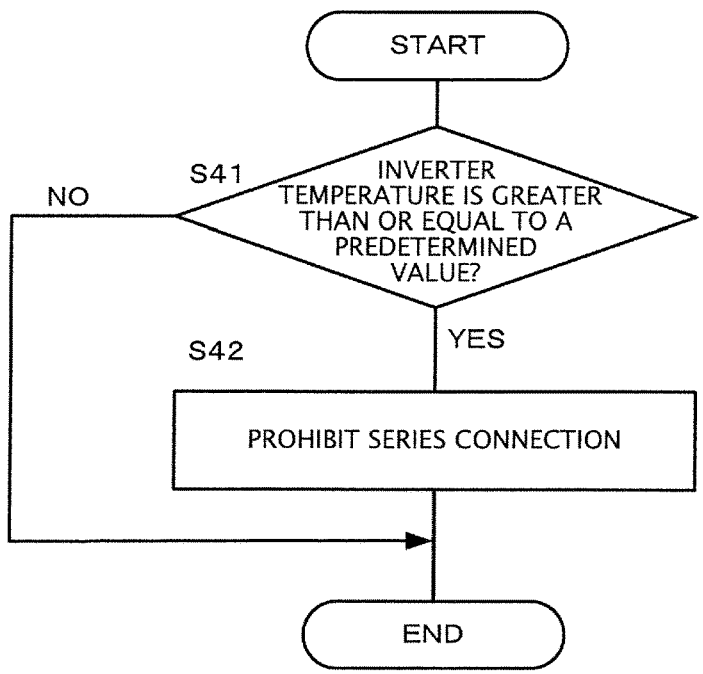
FIG. 10 is a flowchart showing an example process performed in accordance with inverter temperature.

In the present embodiment, the inverter temperature (inverter cooling water temperature) detected by the temperature sensor 34 is supplied to the control unit 30. This inverter temperature corresponds to the temperature of the switching elements of the inverter 20. Subsequently, the control unit 30 performs a control process as shown in FIG. 10.

First, based on the detected cooling water temperature, the control unit 30 determines whether or not the inverter temperature exceeds (is greater than or equal to) a predetermined temperature (S41). When the determination is NO, the process is ended because it is determined that no problem is present. On the other hand, when the determination in S41 is YES, the control unit 30 prohibits series connection of the batteries B1, B2 (S42).

As the temperature of the switching elements of the inverter increases, the withstand voltage of these switching elements decreases. By prohibiting the series connection of the batteries B1, B2 when the general voltage of the series connection exceeds the withstand voltage, it is possible to prevent the voltage applied to the switching elements of the inverter 20 from exceeding the withstand voltage.

Figure 11:
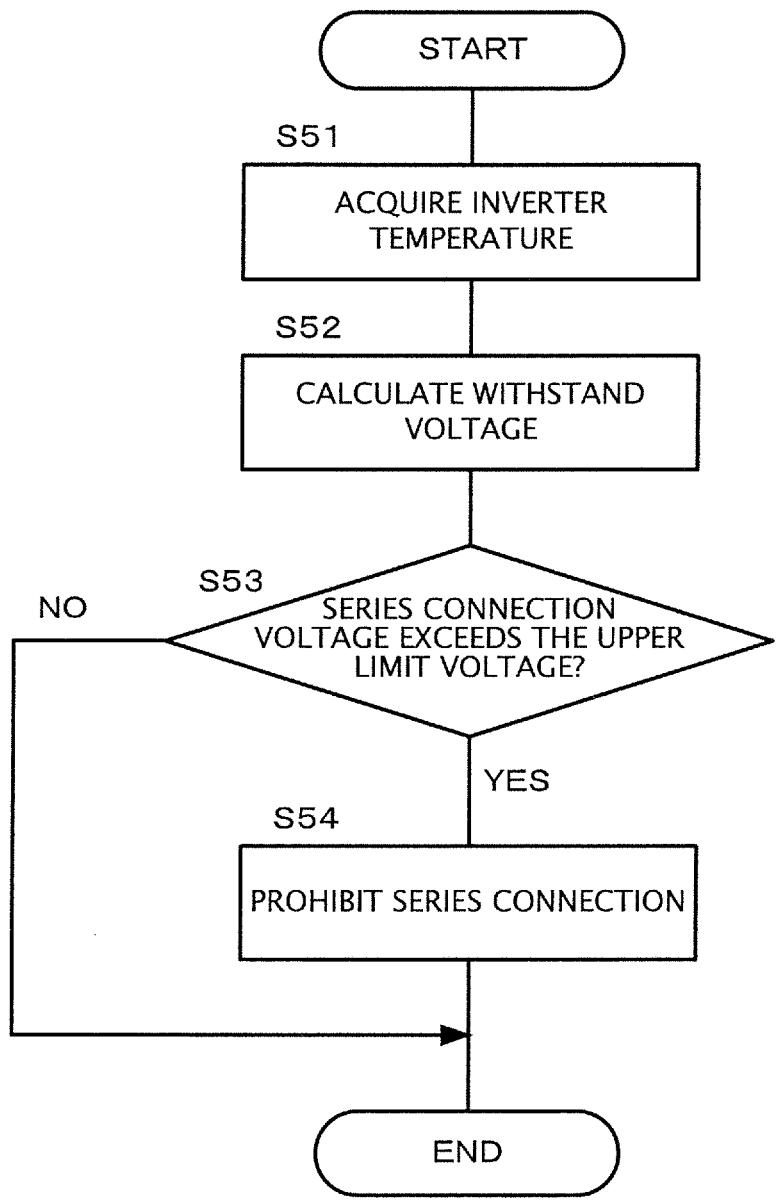
FIG. 11 is a flowchart showing another example process performed in accordance with inverter temperature.

FIG. 11 shows a process performed in a case in which the voltages of the batteries B1, B2 are to be actually detected. First, the inverter cooling water temperature (inverter temperature) is acquired from the temperature sensor 34 (S51). Subsequently, based on the acquired inverter temperature value, an upper limit voltage (withstand voltage) of the switching elements of the inverter 20 is calculated using a map or the like indicating upper limit voltage (withstand voltage) values of the switching elements corresponding to inverter cooling water temperature (inverter temperature) values (S52).

Next, it is determined whether or not the series connection voltage, which is the voltage obtained with the series connection (the total voltage of the batteries B1, B2), exceeds (or is greater than or equal to) the withstand voltage (S53). When NO, the process is ended at that point. When YES, operation in the series connection mode is prohibited (S54). In this way, it is possible to prevent the high-voltage-side voltage VH from exceeding the withstand voltage of the switching elements.

Even when the series connection is not employed, it is undesirable that the high-voltage-side voltage VH exceeds the upper limit voltage applicable to the switching elements of the inverter 20. In other operation modes as well, it is preferable to control the converter 10 such that the high-voltage-side voltage VH does not exceed the withstand voltage.

While situations may differ depending on how the withstand voltage is set, there are cases in which no problems occur so long as the time during which the high-voltage-side voltage VH exceeds the withstand voltage is sufficiently short. In such cases, frequency of the instances in which high-voltage-side voltage VH exceeds the withstand voltage may be reduced by simply prohibiting the series connection mode as described above.

Further, instead of prohibiting the series connection mode of the batteries B1, B2 as described above, frequency of making a transition to the series connection mode may be reduced by configuring such that, during a judging process concerning operation mode transitions, a transition to the series connection mode is less easily permitted. Furthermore, without prohibiting the series connection mode itself, duration of the series connection mode may be limited to a short time by providing a limitation to the duration upon transition to this mode.

Figure 12:
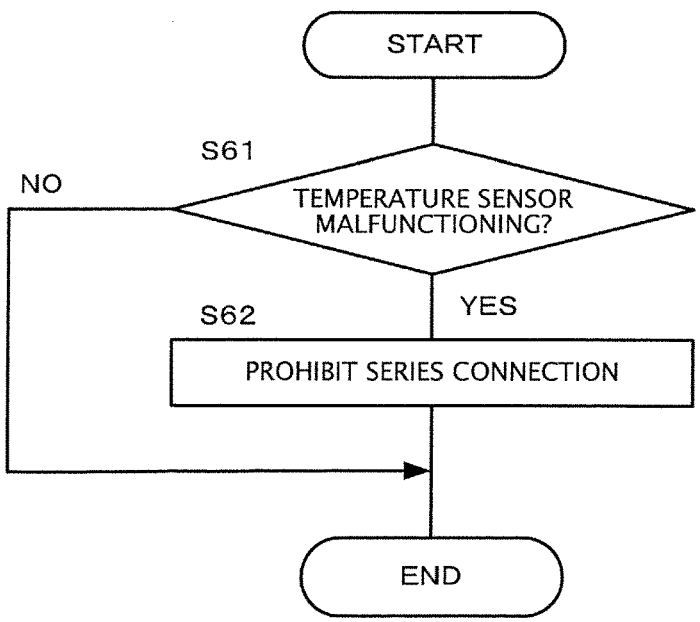
FIG. 12 is a flowchart showing a further example process according to inverter temperature.

FIG. 12 shows another example. In this example, it is judged whether or not the temperature sensor 34 is malfunctioning (S61). When the judged result is YES, series connection of the batteries B1, B2 is prohibited (S62). The judgment regarding whether or not the temperature sensor 34 is malfunctioning can be made using various diagnostic functions, as in the case of the air pressure sensor 32.

According to the above process, it is possible to prevent operation with the high-voltage-side voltage VH being too high.

Figure 13:
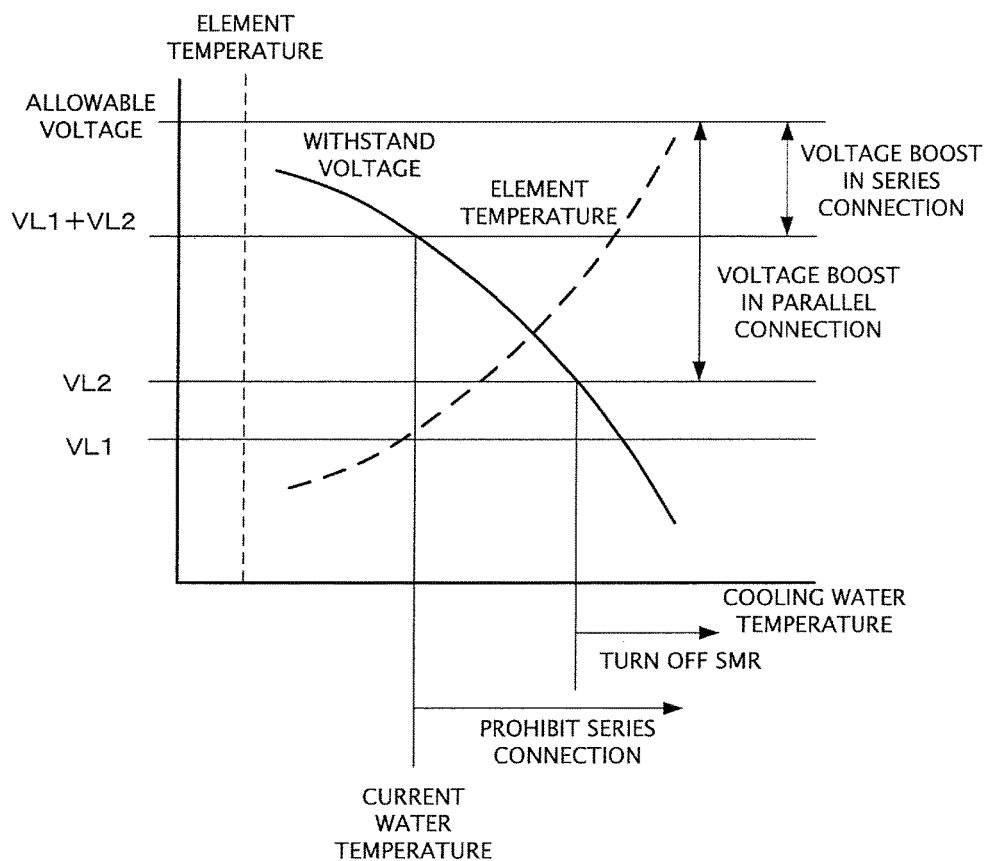
FIG. 13 is a diagram showing a relationship between inverter temperature and the upper limit voltage.

FIG. 13 shows a relationship between the cooling water temperature and the switching element temperature (element temperature), and also a relationship between the cooling water temperature and the upper limit voltage (withstand voltage) value. There is a one-to-one correspondence between the cooling water temperature values and the element temperature values. Further, as the cooling water temperature becomes higher, the upper limit voltage (withstand voltage) becomes lower. In the present embodiment, when the current cooling water temperature increases to a value at which the upper limit voltage (withstand voltage) falls below the voltage VL1+VL2 of the series connection of the batteries B1, B2, the series connection mode is prohibited. With this arrangement, it is possible to prevent the high-voltage-side voltage VH from exceeding the upper limit voltage (withstand voltage) corresponding to the current cooling water temperature even when no voltage boost is performed.

Further, when the current cooling water temperature increases to a value at which the upper limit voltage (withstand voltage) falls below the higher voltage among the voltages of the batteries B1, B2 (in this case, VL2), the system main relay SMR (in this case, SMR2) of the corresponding battery B1 or B2 is turned OFF. Furthermore, when the current cooling water temperature increases to a value at which the upper limit voltage (withstand voltage) also falls below the lower of the voltages of the batteries Bl, B2, both of the system main relays SMR1, SMR2 are turned OFF. With this arrangement, it is possible to prevent the high-voltage-side voltage VH from exceeding the upper limit voltage (withstand voltage) corresponding to the current cooling water temperature.

Motor Lockup

Figure 14:
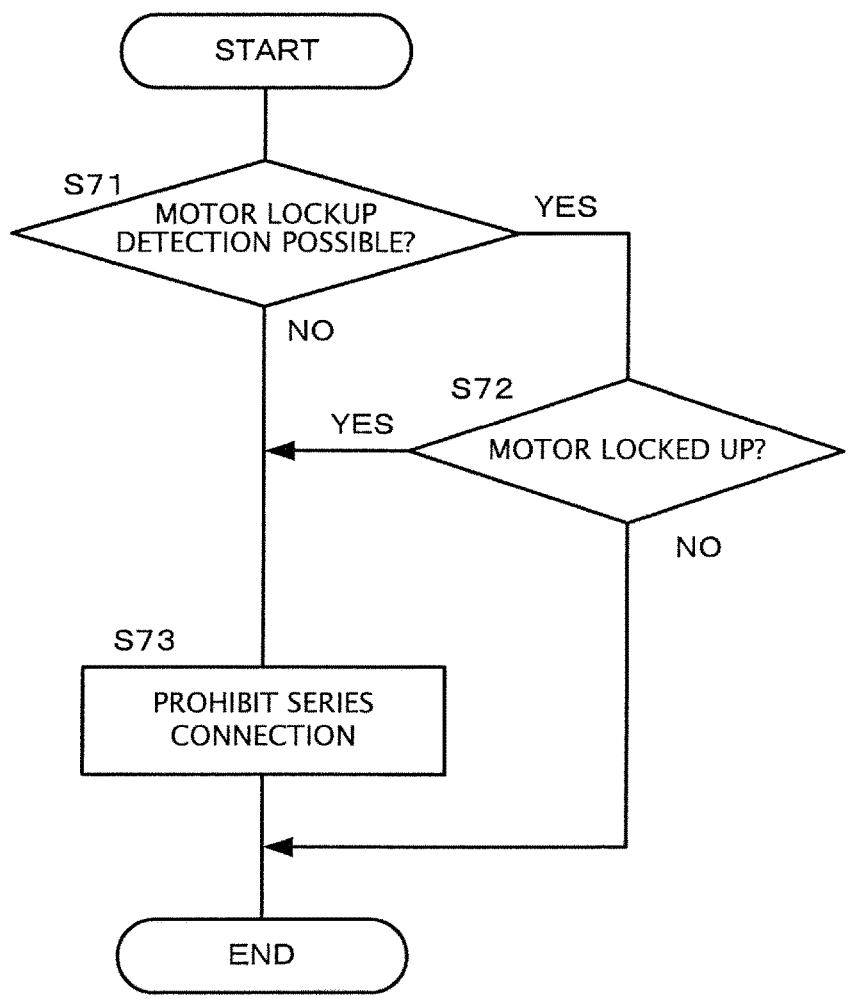
FIG. 14 is a flowchart showing an example process performed in relation to motor lockup.

In the present embodiment, the control unit 30 performs a control process in relation to lockup of the motor generators MG1, MG2 (motor lockup), as shown in FIG. 14.

First, the control unit 30 judges whether or not detection of a motor lockup in the motor generators MG1, MG2 is possible (S71).

As explained above, when the motor generator MG2 is unable to rotate and locked up due to a cause such as presence of a rotational load applied to the wheels 44, current flow is repeated in one same phase of the inverter. Accordingly, the control unit 30 detects a lockup of the motor generators MG1, MG2 from a state of control of the inverter 20 (i.e., a state as to whether or not current flow is repeated in one same phase). Additionally or alternatively, it is also preferable that the output state of the motor generators MG1, MG2 be detected. In other words, a motor lockup can be detected based on the fact that current flow is repeated in one same phase, in combination with the fact that rotational frequency of the output shaft is low even though large electric power is supplied to the motor generators MG1, MG2, or the fact that the rotational frequency does not increase even though large torque is applied to the output shaft, among others.

In S71, the control unit 30 judges whether or not the above-described detection of a motor lockup state is possible. For example, it is judged that detection of a motor lockup state is not possible based on a failure to obtain a detection signal indicating the state of current flow, or a failure to obtain a signal indicating rotational frequency of the output shaft.

When the judgment at S71 is YES, the control unit 30 determines whether the motor generators MG1, MG2 are in a locked state (S72). When this is determined NO (i.e., not in a locked state) in S72, the process is ended because it is determined that no problem is present.

On the other hand, when the judged result in S71 is NO indicating that determination regarding presence or absence of a locked state is not possible, or when the determination at S72 is YES (i.e., in a locked state), the control unit 30 prohibits series connection of the batteries B1, B2 (S73).

When a motor lockup occurs in the motor generators MG1, MG2, as explained above, a large current flows in one same phase of the inverter, such that the temperature of the switching element of that phase increases and its withstand voltage becomes lower. In such a state, by prohibiting entry into the series connection mode, it is possible to prevent the high-voltage-side voltage VH from exceeding the withstand voltage of the switching element. Furthermore, when determination regarding presence or absence of a locked state is not possible, entry into the series connection mode is prohibited.

Figure 15:
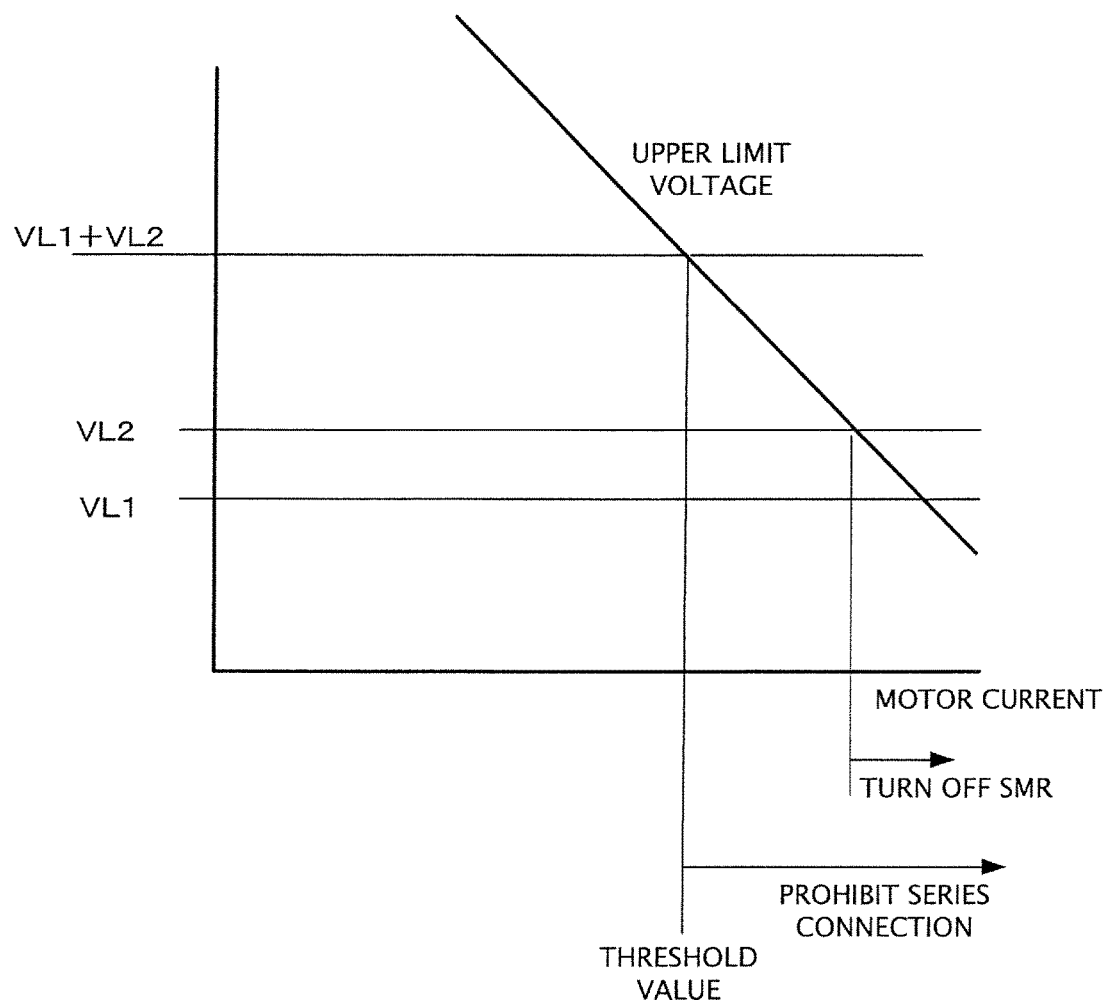
FIG. 15 is a diagram showing a relationship between motor current and the upper limit voltage.

FIG. 15 shows a relationship between current of the motor generators MG1, MG2 (motor current) and the upper limit voltage value. The upper limit voltage of the motor generators MG1, MG2 can basically be determined from the motor current and the applied voltage (motor current× voltage=output electric power). As shown in FIG. 15, as the current flowing through the motor becomes larger when a motor lockup is generated, the temperature of a switching element increases and the upper limit voltage (withstand voltage) of the switching element becomes lower. As shown in FIG. 15, when the motor current reaches a certain threshold value, the upper limit voltage (withstand voltage) of the switching elements becomes equal to the series connection voltage VL1+VL2 of the batteries B1, B2. If the current flowing through the motor increases still further, the voltage VL1+VL2 of the series connection of the batteries B1, B2 would exceed the upper limit voltage (withstand voltage) of the switching elements. For this reason, when the current flowing through the motor exceeds the threshold value shown in FIG. 15, the series connection mode is either prohibited or restricted. With this arrangement, it is possible to prevent the voltage applied to the switching element from exceeding the upper limit voltage (withstand voltage) of the switching element that holds during generation of a motor lockup, even when no voltage boost is performed. Further, when the motor current during generation of a motor lockup increases to a value at which the upper limit voltage (withstand voltage) falls below the higher voltage (in this case, VL2) among the voltages of the batteries B1, B2, the system main relay SMR (in this case, SMR2) of the corresponding battery B1 or B2 is turned OFF. Furthermore, when the motor current increases to a value at which the upper limit voltage (withstand voltage) also falls below the lower of the voltages of the batteries B1, B2, both of the system main relays SMR1, SMR2 are turned OFF. With this arrangement, it is possible to prevent the voltage applied to the switching element from exceeding the upper limit voltage (withstand voltage) of the switching element that holds during generation of a motor lockup.

When Prohibiting the Series Connection

As described above, in the present embodiment, the series connection mode is prohibited or restricted based on the withstand voltages of the motor generators MG1, MG2 and the switching elements of the inverter 20.

Meanwhile, the system of the present embodiment further has the parallel connection mode in which the batteries B1, B2 are connected in parallel, and the single mode. When the series connection mode is prohibited, it is preferable to limit the usable operation modes to the parallel connection mode and the single mode.

Figure 16:
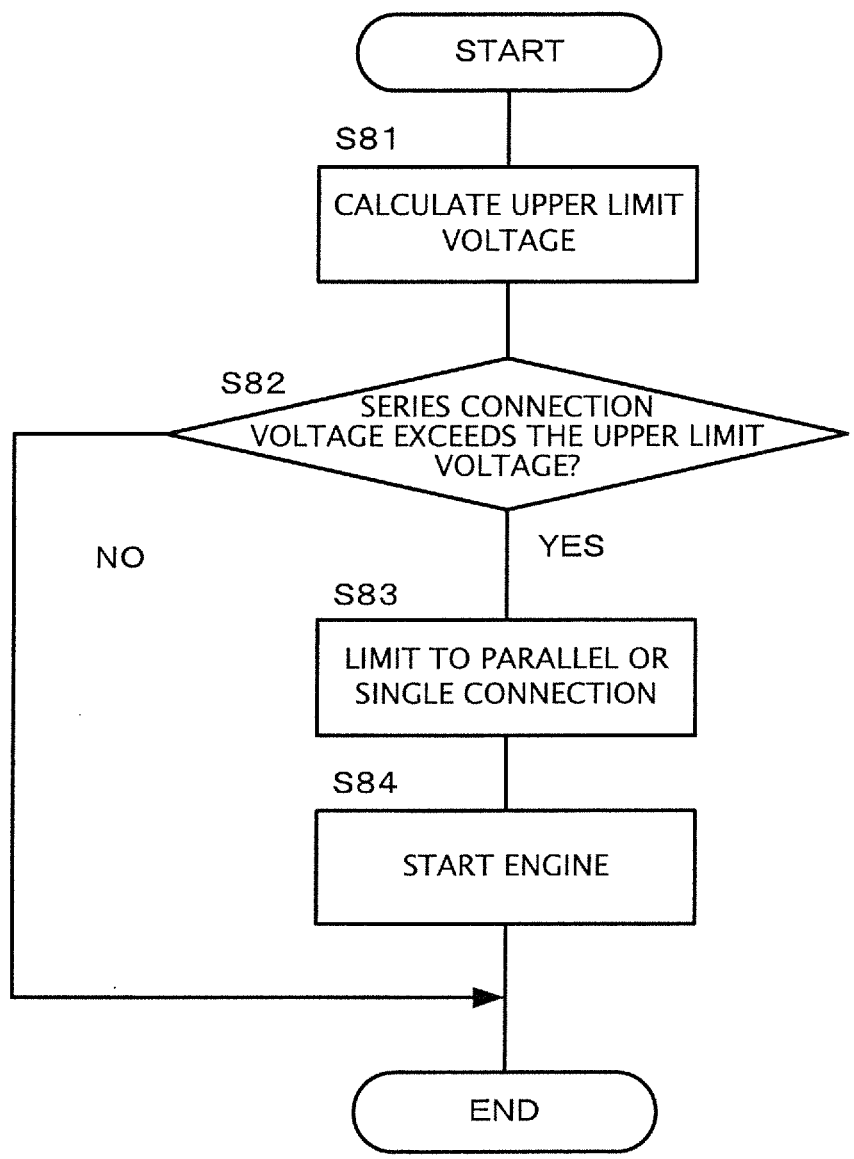
FIG. 16 is a flowchart showing an example process performed under series connection restriction.

Accordingly, the control unit 30 may perform a control process as shown in FIG. 16.

First, by taking into account factors such as air pressure, inverter temperature, and motor lockup state, the upper limit voltage value of the high-voltage-side voltage VH to be applied to the inverter 20 and the motor generators MG1, MG2 is calculated (S81). The series connection voltage VL1+VL2 of the batteries B1, B2 is compared to the upper limit voltage value so as to determine whether or not the voltage VL1+VL2 exceeds the upper limit voltage (S82).

When the result of the determination at S82 is NO, the process is ended at that point because no problem is present. On the other hand, when the determination at S82 is YES, the usable operation modes are limited to the parallel connection mode and the single mode (S83). With this arrangement, it is possible to prevent the output voltage of the converter 10 (i.e., the high-voltage-side voltage VH) from exceeding the upper limit voltage. Alternatively, the operation mode may be limited to the single mode. In that case, it may be preferable to turn off the system main relay SMR corresponding to the unused one of the batteries B1, B2 so as to disconnect the circuit of the unused one of the batteries B1, B2.

Subsequently, the engine 42 is started (S84). As a result, drive power of the engine 42 can be used for travelling. With this arrangement, appropriate travel of the vehicle can be ensured even when the high-voltage-side voltage VH is low and the output from the motor generators MG1, MG2 is not sufficient.

Using the System Main Relay SMR

In the system of the present embodiment, the two batteries B1, B2 are provided on the low-voltage side, and their respective voltages can be controlled separately. Accordingly, there may be a state in which the voltage of one of the batteries B1, B2 is high and the voltage of the other one of the batteries B1, B2 is low. For example, by configuring such that one battery is caused to discharge and the other battery is caused to be charged, such a state can be easily created. For example, it is possible to configure such that the battery having a higher output voltage is used when the output torque of the motor generator MG2 is large, and the battery having a lower output voltage is used when the output is small.

In the above-described state, there may occur a situation in which the output voltage of one of the batteries B1, B2 exceeds a target value of the high-voltage-side voltage VH. For example, due to reasons related to air pressure, inverter temperature, motor lock, and the like, the battery voltage of one of the batteries B1, B2 may become too high for use as a voltage applied to the inverter 20 and the motor generators MG1, MG2.

In such a situation, i.e., when one of the battery voltages VL1, VL2 of the batteries B1, B2 exceeds the upper limit voltage, the battery B1 or B2 having a higher voltage is disconnected from the converter 10 by turning off the corresponding system main relay SMR. As a result, the inverter 20 and the motor generators MG1, MG2 can be driven using only one of the batteries B1, B2 as the power source.

This type of process can be used not just in a system in which the batteries B1, B2 are connectable in series and in parallel as in the present embodiment, but also in a system which includes two batteries and their corresponding converters (power converters) and in which outputs from the two power converters are connected to provide the high-voltage-side voltage VH.

Figure 17:
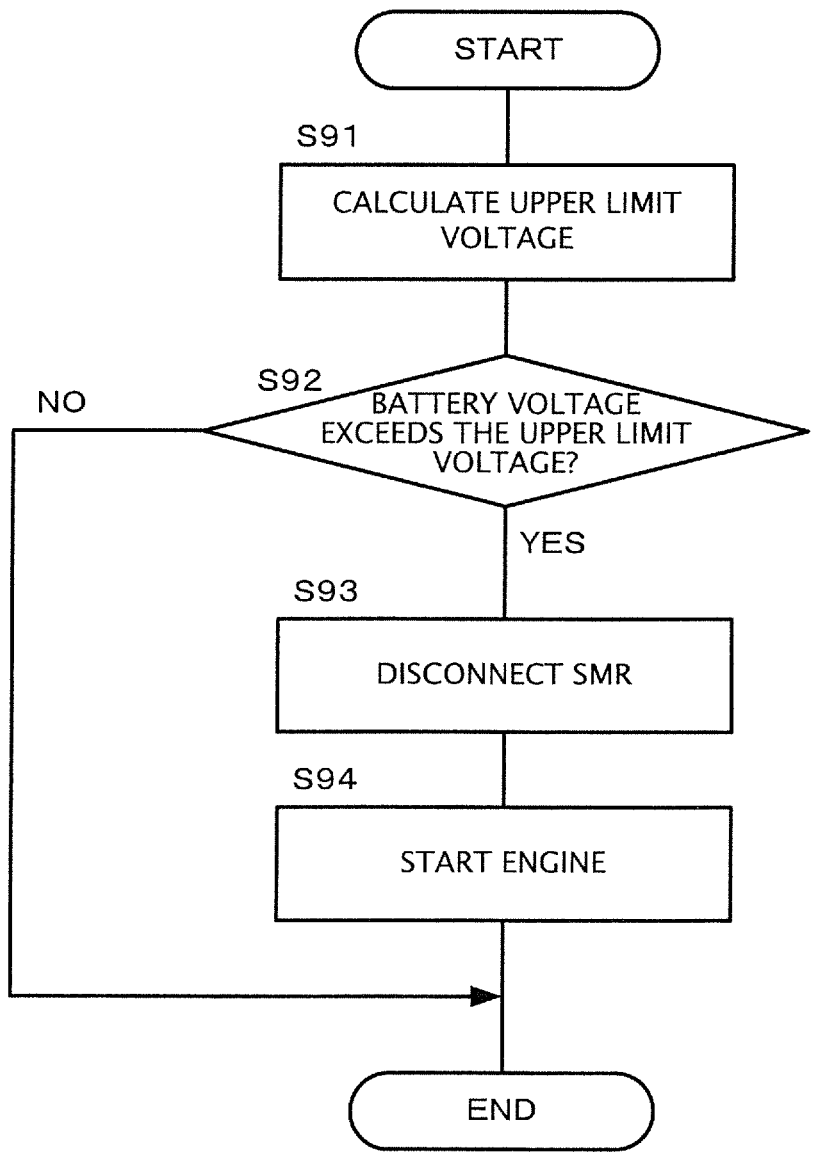
FIG. 17 is a flowchart showing another example process performed for entering the single mode.

FIG. 17 shows a flowchart illustrating the process performed by the control unit 30.

First, as in S81 of FIG. 16, the upper limit voltage value of the high-voltage-side voltage VH is calculated (S91). Next, the respective voltages VL1 and VL2 of the batteries B1, B2 are separately compared to the upper limit voltage so as to determine whether or not either one of the voltages VL1 and VL2 exceeds the upper limit voltage (S92). It should be noted that the system is designed such that there basically does not occur a situation in which both of the voltages VL1 and VL2 exceed the upper limit voltage.

When the result determined in S92 is NO, the process is ended at that point because no problem is present. On the other hand, when the determination at S92 is YES, the SMR corresponding to one of the batteries B1, B2 having the voltage exceeding the upper limit voltage is turned off (S93).

Further, when one of the SMR1 and SMR2 corresponding to the battery B1 or B2 having the voltage exceeding the upper limit voltage is turned off, the engine 42 is subsequently started (S94).

According to the present embodiment, it is possible to prevent the output voltage of the converter 10 (i.e., the high-voltage-side voltage VH) from exceeding the upper limit voltage, and also appropriate travel of the vehicle can be ensured by starting the engine.

Effects Achieved by the Embodiment

According to the present embodiment, in situations in which the upper limit voltage value of the high-voltage-side voltage VH has become decreased due to reasons such as low air pressure, high inverter temperature, and generation of a motor lockup, by restricting series connection of the batteries B1, B2 provided on the low-voltage side, devices connected to the high-voltage side can be protected reliably. Further, by disconnecting the battery B1 or B2 having a high voltage, devices connected to the high-voltage side can be protected reliably.

LIST OF REFERENCE SYMBOLS 10 converter
20 inverter
22 cooler
24 coolant tank
26 pump
30 control unit
32 air pressure sensor
34 temperature sensor
40 motive power distributor
42 engine
44 wheel
46 drive shaft
50 first low-voltage-side circuit
52 second low-voltage-side circuit
B1, B2 battery
CH, CL1, CL2 capacitor
D1-D4 diode
L1, L2 reactor
MG1, MG2 (MG) motor generator
N1, N2, N3 node
R resistor
S1-S4 switching element
SMR1, SMR2 (SMR) system main relay
V1, V2, V3 voltmeter

The invention claimed is:

1. A control device for a vehicle, comprising:
a power converter which performs electric power transmission between a first side and a second side and which is capable of using two power sources located on the first side by switching connection of the two power sources between series connection and parallel connection with one or more switching elements;

an inverter connected to the second side of the power converter; and a temperature sensor for sensing a temperature of the inverter, wherein when the temperature of the inverter is higher than a predetermined value, frequency of use of the two power sources in series connection by the power converter is reduced compared to when the temperature of the inverter is lower than the predetermined value.

2. The control device for a vehicle according to claim 1, wherein when reducing the frequency of use of the two power sources in series connection by the power converter, only one of the two power sources is used by the power converter.

3. The control device for a vehicle according to claim 1, wherein when reducing the frequency of use of the two power sources in series connection by the power converter, an engine mounted on the vehicle is driven to obtain drive power for the vehicle from the engine.

4. A control device for a vehicle, comprising:

a power converter which performs electric power transmission between a first side and a second side and which is capable of using two power sources located on the first side by switching connection of the two power sources between series connection and parallel connection with one or more switching elements;

an inverter connected to the second side of the power converter; and a temperature sensor for sensing a temperature of the inverter, wherein when the temperature of the inverter is undetectable, frequency of use of the two power sources in series connection by the power converter is reduced compared to when the temperature of the inverter is detectable.

5. The control device for a vehicle according to claim 4, wherein when reducing the frequency of use of the two power sources in series connection by the power converter, only one of the two power sources is used by the power converter.

6. The control device for a vehicle according to claim 4, wherein when reducing the frequency of use of the two power sources in series connection by the power converter, an engine mounted on the vehicle is driven to obtain drive power for the vehicle from the engine.

\* \* \* \* \*

UNITED STATES PATENT AND TRADEMARK OFFICE
CERTIFICATE OF CORRECTION

| | |
|---|---|
| PATENT NO. | : 10,059,209 B2 |
| APPLICATION NO. | : 14/739410 |
| DATED | : August 28, 2018 |
| INVENTOR(S) | : Toshiya Hashimoto, Noritake Mitsutani and Kenji Yamada |

Page 1 of 1

It is certified that error appears in the above-identified patent and that said Letters Patent is hereby corrected as shown below:

In the Specification

In Column 3, Line 26, delete "FIG. 58" and insert --FIG. 5B--, therefor.

In Column 7, Line 8, delete "element Si" and insert --element S1--, therefor.

In Column 7, Line 20, delete "element Si" and insert --element S1--, therefor.

In Column 7, Line 38, delete "element Si" and insert --element S1--, therefor.

In Column 11, Line 31, delete "pedal med." and insert --performed.--, therefor.

Signed and Sealed this
Twenty-first Day of May, 2019

Andrei Iancu
*Director of the United States Patent and Trademark Office*